(12) United States Patent
Ishigaki et al.

(10) Patent No.: US 7,804,036 B2
(45) Date of Patent: Sep. 28, 2010

(54) CONTROL SWITCH APPARATUS

(75) Inventors: Seiji Ishigaki, Aichi (JP); Terukazu Hiroe, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 164 days.

(21) Appl. No.: 12/071,242

(22) Filed: Feb. 19, 2008

(65) Prior Publication Data
US 2008/0197004 A1 Aug. 21, 2008

(51) Int. Cl.
*H01H 19/00* (2006.01)
*F16H 35/18* (2006.01)

(52) U.S. Cl. .................... 200/336; 74/10.41

(58) Field of Classification Search ............... 200/565, 200/564, 566, 323, 327, 43.11, 43.16; 74/10.41, 74/10.2
See application file for complete search history.

(56) References Cited

U.S. PATENT DOCUMENTS

| 2,275,284 | A | * | 3/1942 | Carlson | 74/10.41 |
| 3,769,620 | A | * | 10/1973 | Kimura et al. | 74/10.41 |
| 5,571,999 | A | * | 11/1996 | Harris | 200/565 |
| 6,404,354 | B1 | * | 6/2002 | Decker et al. | 200/43.11 |
| 7,019,238 | B2 | * | 3/2006 | Kobayashi | 200/310 |

FOREIGN PATENT DOCUMENTS

| JP | 2002-189559 | 7/2002 |
| JP | 2004-220957 | 8/2004 |

* cited by examiner

Primary Examiner—Felix O Figueroa
(74) Attorney, Agent, or Firm—Morgan, Lewis & Bockius LLP

(57) ABSTRACT

A control switch is equipped with a detent mechanism that generates a click feeling in a dial knob as a result of a detent piece of a plunger member gets over detent crests of a detent crest member. A stopper is provided in the plunger member, and the position of vertical motion of the stopper is switched by means of a rectilinear actuator, thereby switching rotational operation of the dial knob between an enabled state and a disabled state.

7 Claims, 18 Drawing Sheets

CONTROL SWITCH APPARATUS

BACKGROUND OF THE INVENTION

The present invention relates to a control switch apparatus capable of setting operation of the control switch in an "enabled" or "disabled" state and relates to a detent changeover switch capable of switching a click feeling developing in an operating portion of a control switch.

A vehicle has hitherto been equipped with a variety of control switches that are operated at the time of activation of various vehicle-mounted devices, such as an air conditioner, audio equipment, and a car navigation system. Often used as the control switch of this type is a rotary switch that enables selection and designation of various operating functions, such as switching power of a vehicle-mounted device between an ON position and an OFF position, selection of a functional item, and operation pertaining to an amount of operational control, by means of rotation of a dial knob serving as an element to be operated. An example of such a rotary switch is described in JP-A-2004-220957. A rotary switch for use in an air conditioner includes; for example, a temperature setting switch for setting the temperature of an air blast, an air flow rate setting switch for setting the volume of air blow, and a wind direction setting switch for setting the direction of a wind.

Incidentally, in many cases, a rotary switch of an air conditioner is a switch having a limited range of rotational operation where a dial knob is operated within a predetermined rotational control range in order to make temperature setting and selection function setting. Therefore, the rotary switch of this type has a rotation stop mechanism for limiting rotational operation of the dial knob at a predetermined position. According to applications, a rotary switch having a rotational operation range of 120°, a rotary switch having a rotational operation range of 180°, and a rotary switch having a rotational operation range of 270° are prepared. An example rotation stop mechanism has a dial knob, a case for rotatably supporting the dial knob, an engagement portion provided on either the knob or the case, and a portion to be engaged with the engagement portion (an "engaged portion") provided on a remaining element. When the engagement portion contacts the engaged portion during rotation of the dial knob, further rotation of the dial knob is restricted, thereby restricting the range of rotational operation.

However, the rotation stop mechanism described in connection with the background art has a structure in which the engagement portion is provided one of the dial knob and the case and the engaged portion is provided on the remaining element. Hence, both the dial knob and the case must be subjected to machining for implementing a rotation stop mechanism. When a rotary switch is manufactured, both the dial knob and the case require machining processes, and hence there arises a necessity for preparing a product whose dial knob and case differ in shape from their conventional counterparts. For this reason, there exists a desire for using hitherto-used components as intactly as possible by means of reducing the number of required machining processes for machining the rotation stop mechanism.

On the other hand, in order to enhance an operation feel of a dial knob and make operation of the dial knob reliable, the rotary switch of this type is provided with a detent mechanism that imparts desired operating force or a tactile feel to the dial knob as a click feeling. In a common detent mechanism, a plurality of detent crests are provided along the direction of rotation of the knob on either a dial knob to be rotationally operated by an operator or a case supporting the dial knob in a rotatable manner. A detent piece that is urged against the detent crests at all times by means of an urging spring is provided on a remaining one of the dial knob and the case. Operating force developing when the detent piece gets over the detent crest as a result of the dial knob being rotationally operated by the operator is imparted as a click feeling to the operator.

Incidentally, in order to curtail the number of components of the control switch, an attempt has recently been made to share one rotary switch among a plurality of selective functions. In the case of the shared structure of the control switch of this type, when a switch determination mode enters a function selection setting mode in a switch determination initial state and when the dial knob is operated at this time, a switch controller serving as a control unit of an input operation system selects and designates vehicle-mounted equipment for which the operator desires to set a function at that time, by use of a switch signal acquired from a rotary switch. The switch controller switches the switch determination mode to a detailed setting mode after selection and designation of the vehicle-mounted equipment. When the dial knob is operated, details about the vehicle-mounted equipment selected and designated at that time are set to a state conforming to switching operation, by use of the switch signal acquired from the rotary switch at that time.

In the case of the shared structure of the control switch, the click feeling caused in the rotary switch by the detent mechanism desirably changes according to selective functions. Patent Document 1 describes; for example, a detent changeover technique of switching a click feeling from one selective function to another by means of the shared structure of the control switch of this type. The technique described in Patent Document 1 is for vertically positioning a plurality of discs whose detent crests are spaced at different pitches; vertically moving the detent piece by means of an actuator so as to selectively bring the detent piece into elastic contact with one detent crest of one of the discs, thereby switching a click feeling acquired at the time of rotational operation of the dial knob.

According to the technique described in JP-A-2002-189559, when one rotary switch is shared among a plurality of selection functions, the click feeling developing in the dial knob can be switched from one selection function to another. However, since each click feeling to be generated requires a disc, discs equal in number to all of the click feelings to be generated are required. Therefore, as the number of click feelings to be developed in one rotary switch increases, the number of required discs is increased correspondingly. Hence, the number of discs provided in the control switch apparatus becomes greater, which in turn leads to a fear of an increase in the size of the control switch apparatus. Moreover, when the number of components of discs increases, component costs are correspondingly incurred in the discs, and there is a fear of this leading to an increase in the component costs.

SUMMARY OF THE INVENTION

An objective of the present invention is to provide a control switch apparatus capable of implementing an operation restriction mechanism for setting an operation range on an operating portion through a small number of processes for machining components.

Another objective of the present invention is to provide a detent changeover switch apparatus capable of switching a click feeling to be generated by one control switch with a small number of components.

In order to solve the problem, the present invention provides the following arrangements.

(1) A control switch apparatus for performing selection function operation, comprising:

a control switch that includes an operating portion to be operated by an operator and a fixed portion;

a detent crest member that has a concave/convex pattern which is aligned in an operating direction of the operating portion and is provided on one of the operating portion and the fixed portion;

a plunger member that is provided on the other of the operating portion and the fixed portion and includes an urging member and a piece member to be brought into elastic contact with the concave/convex pattern by the urging member so that a click feeling is generated at the operating portion when the piece member gets over a projection portion of the concave/convex pattern at the time of operating the operating portion; and an operation restriction mechanism that includes a stopper member for directly or indirectly acting on the detent crest member and restricting motion of the operating portion to switch the operation of the operating portion between an enable state and a disable state.

(2) The control switch according to claim (1), wherein the operation restriction mechanism includes:

the stopper member that is formed separately from the piece member and is movably assembled into the plunger member so as to become able to press the piece member from behind;

a cross rectilinear actuator that acts as a drive source for operating the stopper member and includes a drive shaft capable of performing reciprocal linear movement, an operating direction of the drive shaft being oriented so as to cross an operating direction of the stopper member;

a converter that transmits linear motion of the cross rectilinear actuator to the stopper member to drive the stopper member in the operating direction of the stopper member;

a detector that detects an operating state in which the operator operates the operating portion; and a controller that controls and drives the cross rectilinear actuator in accordance with an amount of detection acquired by the detector and causes the stopper member to restrict the motion of the piece member, thereby controlling the enable state and the disable state of the operation of the operating portion.

(3) The control switch according to (1), wherein the operation restriction mechanism includes:

the stopper member that is formed separately from the piece member and is movably assembled into the plunger member so as to become able to press the piece member from behind;

a parallel rectilinear actuator that acts as a drive source for operating the stopper member and includes a drive shaft capable of performing reciprocal linear movement, an operating direction of the drive shaft being oriented parallel to an operating direction of the stopper member;

a detector that detects operating state in which the operator operates the operating portion; and a controller that controls and drives the parallel rectilinear actuator in accordance with an amount of detection acquired by the detector and that causes the stopper member to restrict the motion of the piece member, thereby controlling the enable state and the disable state of the operation of the operating portion.

(4) The control switch according to (1), wherein the operation restriction mechanism includes:

the stopper member that is formed integrally with the piece member and is movably assembled into the plunger member so as to become able to press the piece member from behind;

a cross rectilinear actuator that acts as a drive source for operating the stopper member and includes a drive shaft capable of performing reciprocal linear movement, an operating direction of the drive shaft being oriented so as to cross an operating direction of the stopper member;

a converter that transmits linear motion of the cross rectilinear actuator to the stopper member to drive the stopper member in the operating direction of the stopper member;

a detector that detects an operating state in which the operator operates the operating portion; and a controller that controls and drives the cross rectilinear actuator in accordance with an amount of detection acquired by the detector and causes the stopper member to restrict the motion of the piece member, thereby controlling the enable state and the disable state of the operation of the operating portion.

(5) The control switch according to (1), wherein the operation restriction mechanism includes:

the stopper member that is formed separately from the piece member and is movably attached to the plunger member so as to become able to press the piece member from behind;

a solenoid that acts as a drive source for operating the stopper member, and includes a movable metal attached to the stopper member and an excitation coil for restricting motion of the movable metal by turning on or off energization of the excitation coil;

a solenoid-side urging member that is interposed between the movable metal of the solenoid and a case interior surface of the plunger member and brings the piece member into elastic contact with the concave/convex pattern;

a detector that detects an operating state in which the operator operates the operating portion; and a controller that controls and drives the solenoid in accordance with an amount of detection acquired by the detector and causes the stopper member to restrict the motion of the piece member, thereby controlling the enable state and the disable state of the operation of the operating portion (6) The control switch according to (1), wherein the operation restriction mechanism includes:

the stopper member that is directly engageable with a recess of the detent crest member;

a parallel rectilinear actuator that acts as a drive source for operating the stopper member and includes a drive shaft for performing reciprocal linear movement, an operating direction of the drive shaft being oriented parallel to an operating direction of the stopper member;

a detector that detects operating state in which the operator operates the operating portion; and a controller that controls and drives the parallel rectilinear actuator in accordance with an amount of detection acquired by the detector, thereby controlling the enable state and the disable state of the operation of the operating portion by bringing the stopper member into engagement with or disengagement from the recess of the concave/convex pattern.

(7) A detent changeover switch apparatus for performing a selection function operation, comprising:

a control switch that includes an operating portion to be operated by an operator and a fixed portion;

a detent crest member that has a concave/convex pattern which is aligned in an operating direction of the operating portion and is provided on one of the operating portion and the fixed portion;

a plunger member that is provided on the other of the operating portion and the fixed portion and includes an urging member and a piece member to be brought into elastic contact with the concave/convex pattern by the urging member so that a click feeling is generated at the operating portion when the piece member gets over a projection portion of the concave/convex pattern at the time of operating the operating portion; and a detent changeover mechanism that switches intensity a click feeling generated at the operating portion by switching an amount of expansion and contraction of the urging member.

(8) The detent changeover switch according to (7), wherein the detent changeover mechanism includes:

an urging support member that supports the urging member between the piece member and the urging support member;

an actuator that serves as a drive source for switching a travel position of the urging support member;

a detector that detects an operating state in which the operator operates the operating portion; and a controller that switches urging force of the urging member by controlling the actuator in accordance with an amount of detection acquired by the detector, to switch the position of the urging support member, thereby switching the click feeling.

(9) The detent changeover switch according to (8), wherein the actuator includes:

a cross rectilinear actuator that acts as a drive source for moving the position of the urging support member and includes a drive shaft for performing reciprocal linear movement, an operating direction of the drive shaft being oriented so as to cross an operating direction of the urging support member; and a converter that transmits linear motion of the cross rectilinear actuator to the urging support member to drive the urging support member in the operating direction of the urging support member.

According to the present configuration, the operation restriction mechanism for setting enabling or disabling of operation of the operating portion can be handled as a single unit component. Therefore, at the time of manufacture of a control switch having an operation restriction mechanism, the essential requirement is to assemble an existing control switch unit into the unit component. Implementation of the invention becomes easy in this case.

According to the present invention, there can be provided an operation restriction mechanism for imparting an operation range to an operating portion through a smaller number of processes for machining components.

According to the present invention, a click feeling developing in one control switch can be switched by means of a small number of components.

DETAILED DESCRIPTION OF PREFERRED EMBODIMENTS

First Embodiment

A first embodiment of a control switch embodying the present invention will be described hereunder by reference to FIGS. 1 through 9.

Figure 1:
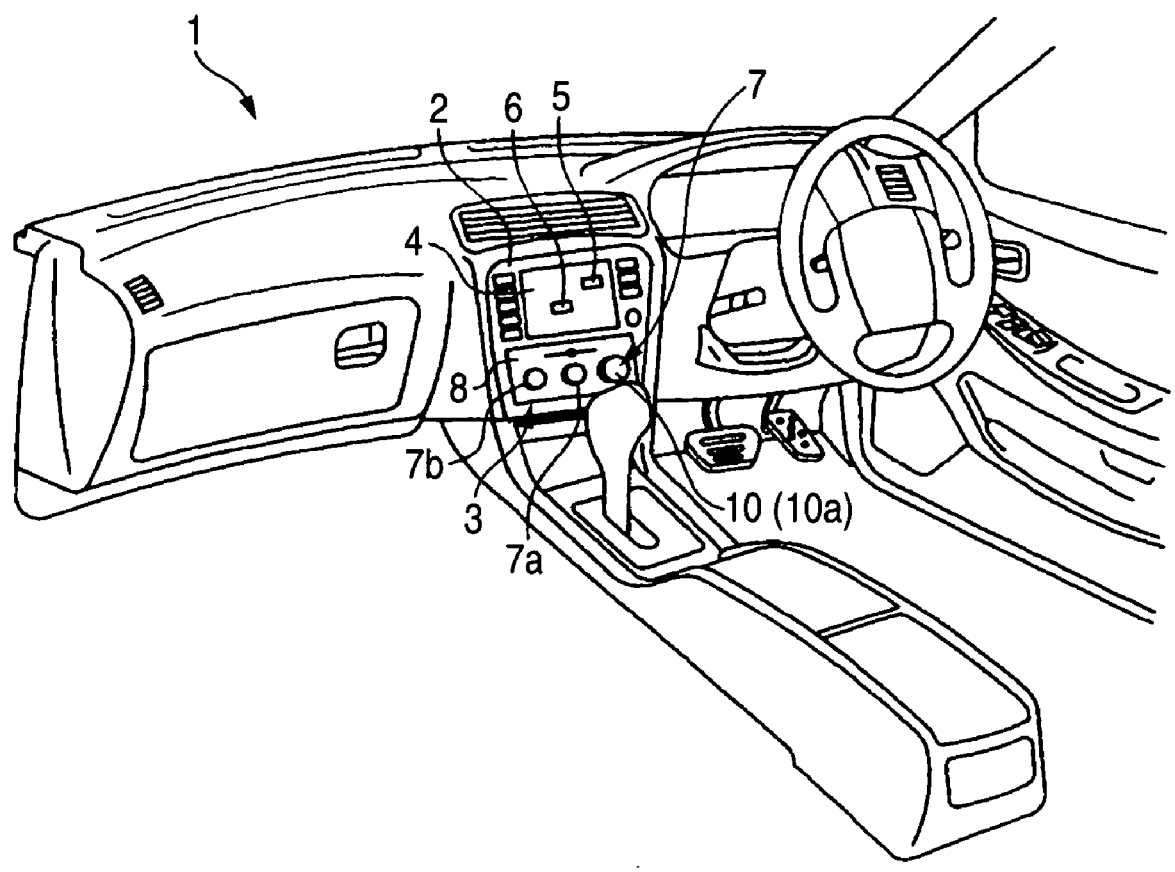
FIG. 1 is a perspective view of an interior of a vehicle's interior of a first embodiment.

As shown in FIG. 1, a center cluster 2 of a vehicle 1 is equipped with a control switch apparatus 3 as an operation system for various types of vehicle-mounted equipment, such as an air conditioner, an audio system, and a car navigation system. The control switch apparatus 3 of the present embodiment uses a graphical user interface (GUI) with a view toward enhancing visibility or operability achieved during operation for selecting a button. In the control switch apparatus 3 of graphical user interface type, an item button 5, an icon 6, and the like, are graphically displayed on a display 4 mounted in the center cluster 2. While selecting and designating the item button 5, the icon 6, or the like, on the display 4 by means of a control switch 7 provided in the center cluster 2, input operation is performed by use of a determination switch 7a or a return switch 7b provided adjacent to the control switch 7.

Figure 2:
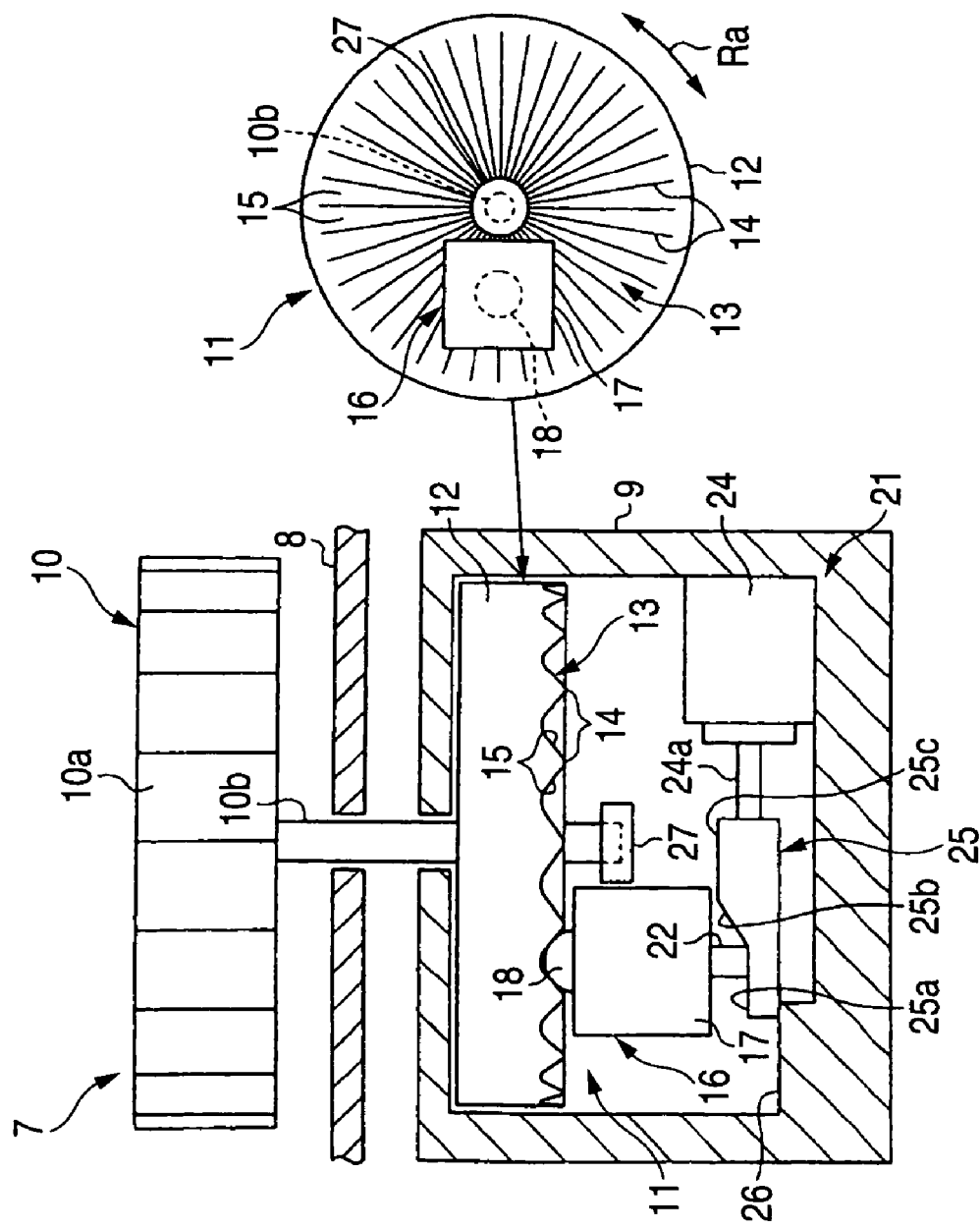
FIG. 2 is a longitudinal cross-sectional view showing a general configuration of a control switch having an operation restriction mechanism.

As shown in FIG. 2, a switch case 9 for housing various switching components of the control switch 7 is fixedly attached to an interior side of a cluster panel 8 of the center cluster 2. When the control switch 7 is of a dial operation type, a dial knob 10 is attached, in a rotationally operable state, to the switch case 9 as a portion to be operated during switching operation. The dial knob 10 is made up of an essentially-cylindrical knob portion 10a serving as a grip portion during operation of the switch, and an operation shaft 10b extending vertically, integrally from a coaxial position on a bottom surface of the knob portion 10a. The dial knob 10 corresponds to a control portion.

Figure 3:
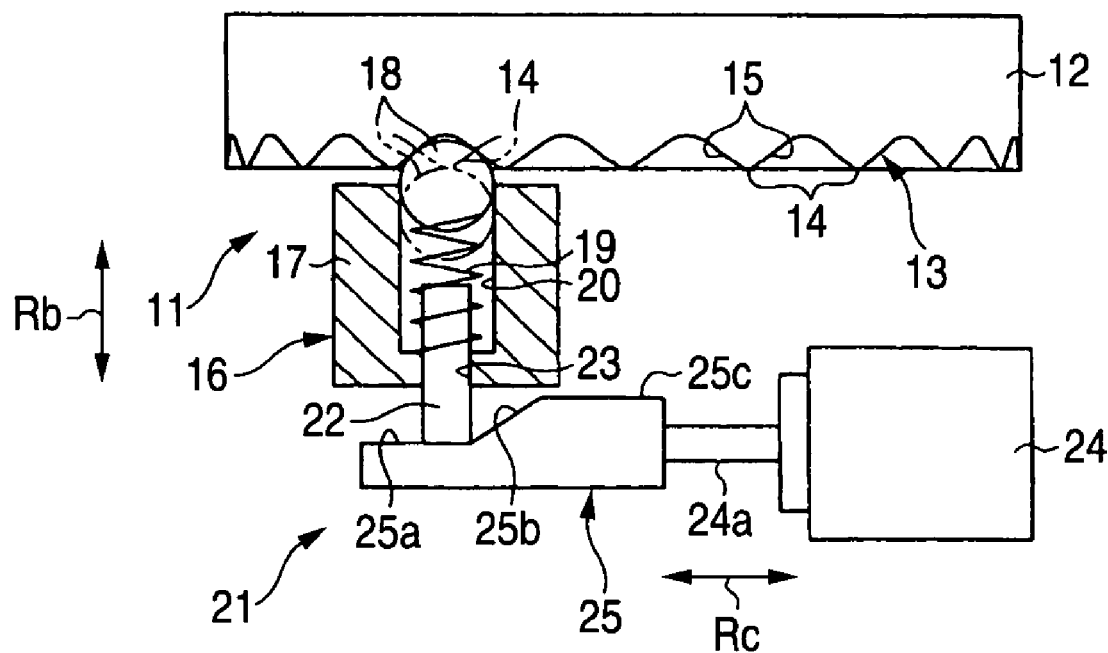
FIG. 3 is a partially-cutaway side view showing an operation restriction mechanism achieved when operation of a dial knob is enabled.
Figure 4:
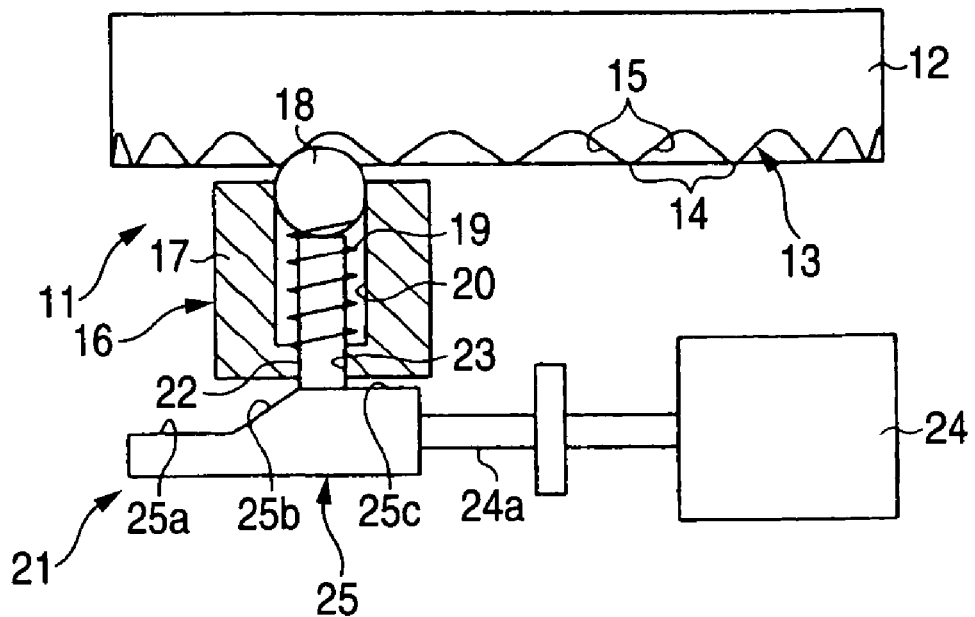
FIG. 4 is a partially cutaway side view showing the operation restriction mechanism achieved when the operation of the dial knob is disabled.
Figure 5:
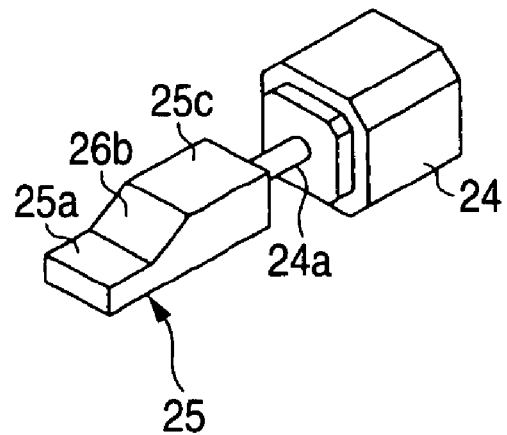
FIG. 5 is a perspective view showing a rectilinear actuator serving as a drive source for the operation restriction mechanism.

As shown in FIGS. 2 through 4, a detent mechanism 11 for generating a click feeling from the dial knob 10 when the dial knob 10 is rotationally operated is provided in the switch case 9. In the following descriptions about the detent mechanism 11, a detent crest member 12 (hereinafter called simply "crested member") shaped approximately like a disc is fixedly attached to a lower end of the operation shaft 10b of the dial knob 10 while being positioned concentrically with the knob portion 10a. A concave/convex pattern 13 is formed over a bottom surface of the crested member 12 along the direction of rotational operation of the dial knob 10 (direction of arrow Ra in FIG. 2). In the concave/convex pattern 13, a plurality of detent crests 14 (hereinafter called simply "crest") and a plurality of detent valleys 15 (hereinafter called simply "valley") are arranged one after another along the direction of rotational operation of the dial knob 10. The crests 14 correspond to protuberant portions.

A plunger member 16 that imparts a click feeling to the dial knob 10 in cooperation with the crested member 12 is provided at a position below the crested member 12 within the switch case 9. The plunger member 16 has a plunger case 17 shaped approximately like a rectangular parallelepiped, and the plunger case 17 is fixed to an interior wall surface of the switch case 9. A detent piece 18 (hereinafter called simply "piece") assuming; for example, a spherical shape, is attached to the plunger case 17 so as to be elastically held in contact with the concave/convex pattern 13 at all times by means of an urging member 19 (see FIGS. 3 and 4) made up of a coil spring, or the like, and to be able to move relatively along the urging direction of the urging member 19 (i.e., direction of arrow Rb in FIG. 3). The piece 18 corresponds to a piece member.

As shown in FIGS. 3 and 4, an accommodation portion 20 opened toward the concave/convex pattern 13 of the crested member 12 is formed like an indent in the plunger case 17, and the piece 18 is accommodated in the accommodation portion 20 so as to be able to move relatively. The urging member 19 is also accommodated in the accommodation portion 20 and attached in such a way that one end of the urging member 19 remains in contact with the piece 18 and that the other end of the same contacts the bottom surface of the accommodation portion 20. The piece 18 is able to perform rectilinear reciprocal motion within the accommodation portion 20. In the present embodiment, the piece 18 can move along a direction of the operation shaft of the dial knob 10.

When the dial knob 10 is rotationally operated, the crested member 12 is synchronously rotated in association with the rotational movement of the dial knob 10, whereupon the crested member 12 performs rotational movement with respect to the plunger member 16 located on the case side. At this time, as indicated by a two-dot chain line shown in FIG. 3, the piece 18 of the plunger member 16 makes a motion so as to get over the crests 14 of the crested member 12 against urging force of the urging member 19. Resisting force originating every time the piece 18 gets over the crest 14 is generated as a click feeling of the dial knob 10. The click feeling generated by the detent mechanism 11 is determined by various elements, such as the height of the crests 14, an interval between the crests 14, the size of the piece 18, and the urging force of the urging member 19.

The control switch apparatus 3 is provided with an operation restriction mechanism 21 that inhibits rotational operation of the dial knob 10 at a predetermined position, to thus disable further rotational operation of the knob from that position. In the following descriptions about the operation restriction mechanism 21, a stopper 22 that is shaped like a rod and that operates so as to restrict motion of the piece 18 is provided in the plunger member 16 so as to be able to linearly move along the urging direction of the urging member 19. The stopper 22 is inserted into a hole portion 23 drilled through a bottom wall of the plunger case 17 while being able to make a linear motion. The stopper 22 is attached in such a way that one end of the stopper is situated in the plunger case 17 and that the other end of the same is exposed outside the plunger case 17. In the plunger case 17, the stopper 22 is attached while being inserted into the urging member 19. The stopper 22 constitutes a stopper member (a plunger stopper member).

A rectilinear actuator 24 that operates as a drive source for the operation restriction mechanism 21 is housed in the switch case 9. The rectilinear actuator 24 is an actuator which outputs driving force in the form of reciprocal linear motion of the drive shaft 24a. For instance, a motor mechanism, or the like, that converts rotational force of an electromagnetic solenoid or a motor (a DC motor) into linear motion of the drive shaft 24a and outputs the linear motion, is used as a drive source for the rectilinear actuator. The rectilinear actuator 24 is mounted transversely with respect to the urging direction of the urging member 19; namely, with respect to the operation shaft 10b of the dial knob 10, in such a way that the drive shaft 24a of the actuator performs reciprocal linear motion in a direction (i.e., a direction of arrow Rc in FIG. 3) crossing at right angles the urging direction of the urging member 19. The rectilinear actuator 24 corresponds to a cross rectilinear actuator.

As shown in FIGS. 2 through 5, a support member 25 that supports from below the stopper 22 attached to the plunger member 16 is fixedly attached to an extremity of the drive shaft 24a of the rectilinear actuator 24. The rectilinear actuator 24 reciprocally actuates the support member 25 attached to the drive shaft 24a along a direction orthogonal to the urging direction of the urging member 19, thereby reciprocally, linearly actuating the support member 25 between two positions in the present embodiment; namely, an unlocked position (a state shown in FIG. 3) where the stopper 22 is unlocked and a locked position (a state shown in FIG. 4) where the stopper 22 is locked.

A removal prevention portion 25a that prevents removal of the stopper 22 remaining in the unlocked state is formed at a position close to the extremity of the support member 25, so as to become lower than the other area of the support member 25. A slope portion 25b that pushes the stopper 22 located at the unlocked position higher up to the locked position when the support member 25 is linearly actuated in its protruding direction by the rectilinear actuator 24 is formed at the center position of the support member 26. A holding portion 25c is formed at a position close to a base end of the support member 25, wherein the holding portion holds, at a position higher than the removal prevention portion 25a, the stopper 22 pushed high from the unlocked position by means of the slope portion 25b, thereby holding the stopper 22 at the locked position. Moreover, a guide support table 26 (see FIG. 2) that supports the extremity of the support member 25 so as to be able to perform linear motion is formed in the switch case 9. The support member 25 corresponds to converter.

As shown in FIG. 2, an encoder 27 that detects the amount of rotation (the number of rotations) of the dial knob 10 is attached to a lower end of the operation shaft 10b of the dial knob 10. The encoder 27 is made up of; for example, a pulse encoder that outputs a value of detected rotation in the form of a pulse signal. At the time of detection of rotation of the dial knob 10, the encoder can output a detection signal having the number of pulses corresponding to the amount of rotation of the dial knob 10 achieved at that time. The determination switch 7a, the return switch 7b, and the encoder 27 constitutes detector.

Figure 6:
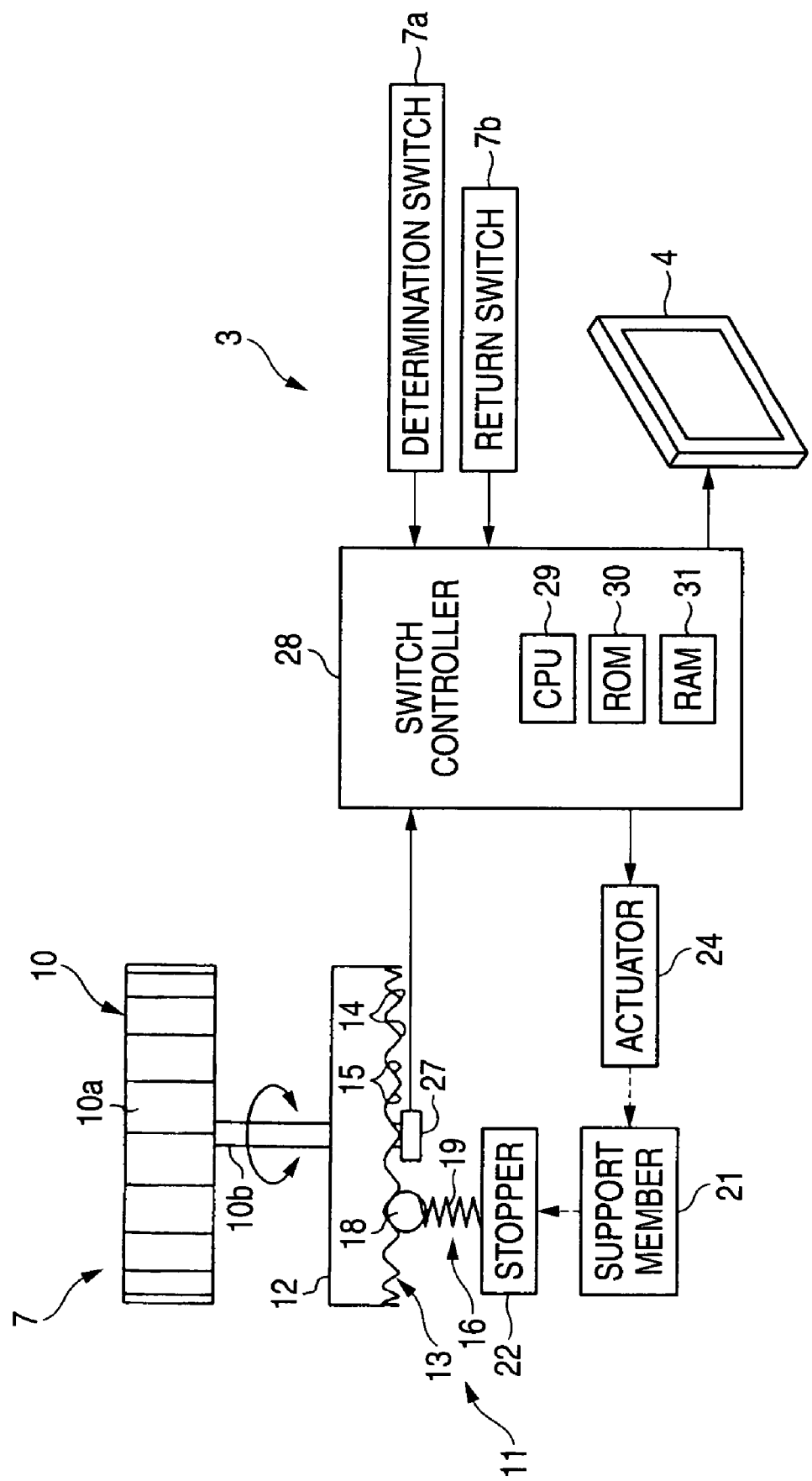
FIG. 6 is a general schematic view showing the configuration of the control switch.

As shown in FIG. 6, the control switch apparatus 3 is equipped with a switch controller 28 acting as a control unit of the control switch apparatus 3. The switch controller 28 is made up of a CPU 29 for controlling the switch controller 28 in a centralized manner; ROM 30 storing various programs and data groups; RAM 31 used as a work area during a program event; and the like. The switch controller 28 is operated by means of a control program in the ROM 30. The switch controller 28 computes the amount of rotational operation of the dial knob 10 by use of a detection signal detected by the encoder 27; supplies information about the amount of operation to another control unit that requires the amount of rotational operation; and switches a screen display on the display 4.

Further, the switch controller 28 controls, on the basis of the amount of rotational operation of the dial knob 10 detected by use of the detection signal acquired from the encoder 27, enabling or disabling of rotational operation of the dial knob 10 while taking the rectilinear actuator 24 as a drive source. Namely, when the dial knob is in the range of rotational operation where rotational operation of the dial knob 10 is enabled, the switch controller 28 drives the rectilinear actuator 24 into unlock, thereby bringing the stopper 22 into an unlocked state and enabling rotational operation of the dial knob 10. In the meantime, when the dial knob 10 reached a dial knob operation stop position where rotational operation of the dial knob 10 is to be disabled, the switch controller 28 drives the rectilinear actuator 24 into lock, thereby bringing the stopper 22 into a locked state and disabling further rotational operation of the dial knob 10. The switch controller 28 corresponds to controller.

Operation of the control switch apparatus 3 of the present embodiment will now be described.

Figure 7:
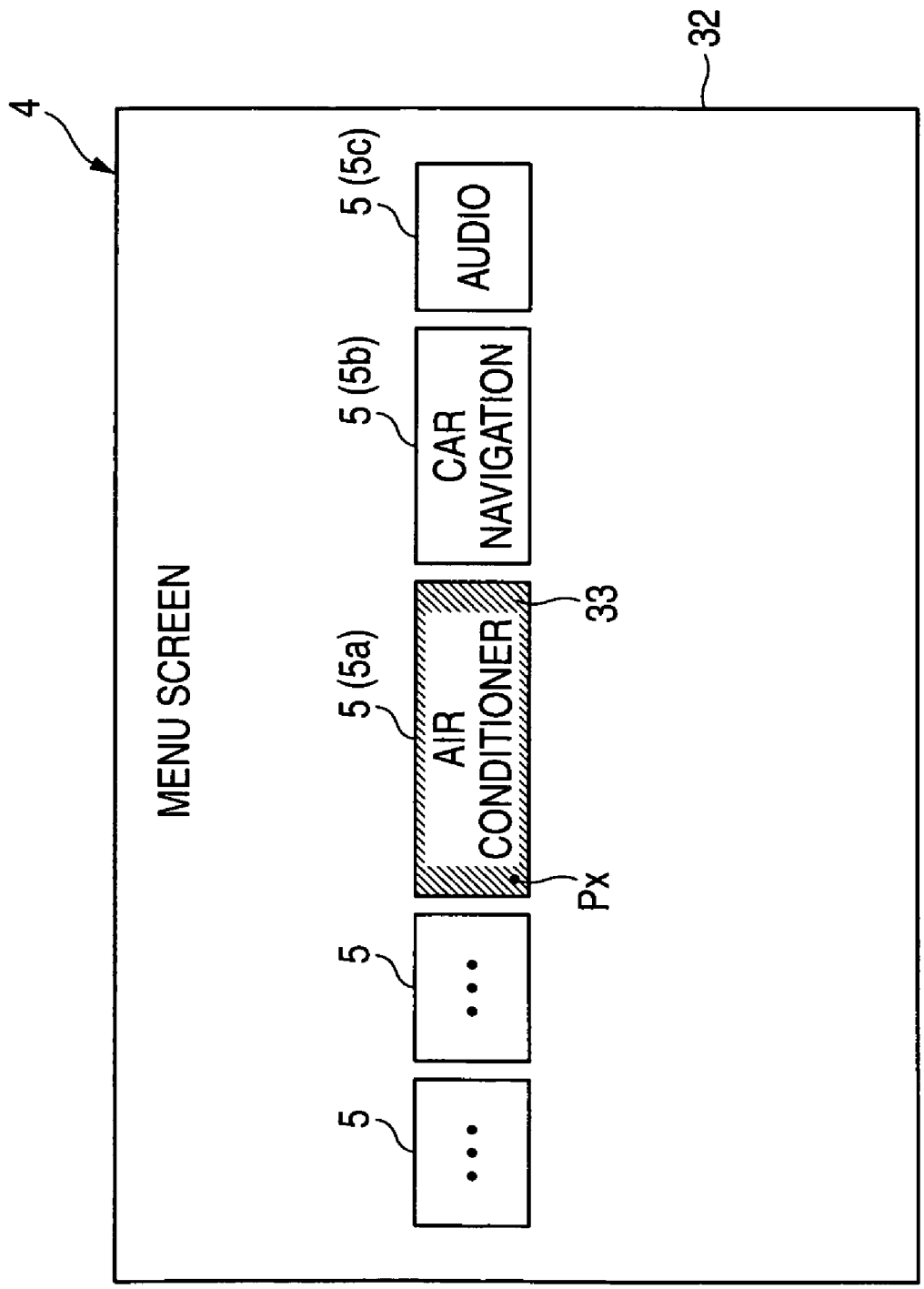
FIG. 7 is a view of a menu screen appearing on a display.

When an ignition switch (omitted from the drawings) of the vehicle 1 is operated to an ACC position or an IG position, the switch controller 28 enters a start-up state, thereby setting its operation mode to an item button selection mode; displaying a menu screen 32 shown in FIG. 7 as an initial operation screen on the display 4; and recognizing the control switch 7 as an item button selection switch. A plurality of item buttons 5, 5 . . . that are to be selectively designated at the time of setting of functions of various vehicle devices mounted in the vehicle 1 are displayed in an assigned manner on the menu screen 32. The item buttons 5, 5 . . . displayed on the menu screen 32 include; for example, an air conditioner function setting button 5a selected at the time of setting of each of functions of an air conditioner; a car navigation button 5b selected at the time of setting of each of functions of a car navigation system; an audio button 5c selected at the time of setting of each of functions of audio equipment, and the like.

Selective designation of the item button 5 on the menu screen 32 is performed by means of moving a selection coordinate position Px on the display 4 through use of the dial knob 10, to thus locate a button focus 33 on a desired item button 5; and depressing the determination switch 7a (see FIGS. 1 and 6) provided in the center cluster 2 after positioning of the button focus. After recognizing selective operation of the determination switch 7a, the switch controller 28 recognizes, as an operation request button, the item button 5 where the selection coordinate position Px has been situated immediately before operation of the determination switch 7a; and causes the vehicle 1 to perform processing operation responsive to the function of the operation request button.

In a case where, when the item button 5 is selectively operated on the menu screen 32, the control switch 7 is used at this time as an unlimited rotational-control switch whose rotational operation range is not limited, the switch controller 28 drives the rectilinear actuator 24 into unlock regardless of the position of rotational operation of the dial knob 10 even when the knob is situated at any position, thereby holding the support member 25 attached to the drive shaft 24a in the unlocked position (the state shown in FIG. 3). As a result, the stopper 22 comes into the unlocked state where the dial knob 10 is lowered even when the knob is situated at any position of rotational operation. Hence, relative linear motion of the piece 18 aligned to the urging direction of the urging member 19 is enabled over the entire range of rotational operation of the piece, and rotational operation of the dial knob 10 is allowed over the unlimited range of rotational operation. Consequently, the control switch 7 serves as an unlimited rotational-control switch. When the dial knob 10 is rotationally operated, the piece 18 remaining in elastic contact with the concave/convex pattern 13 of the crested member 12 moves up and down, whereupon a click feeling arises in the dial knob 10.

Figure 8:
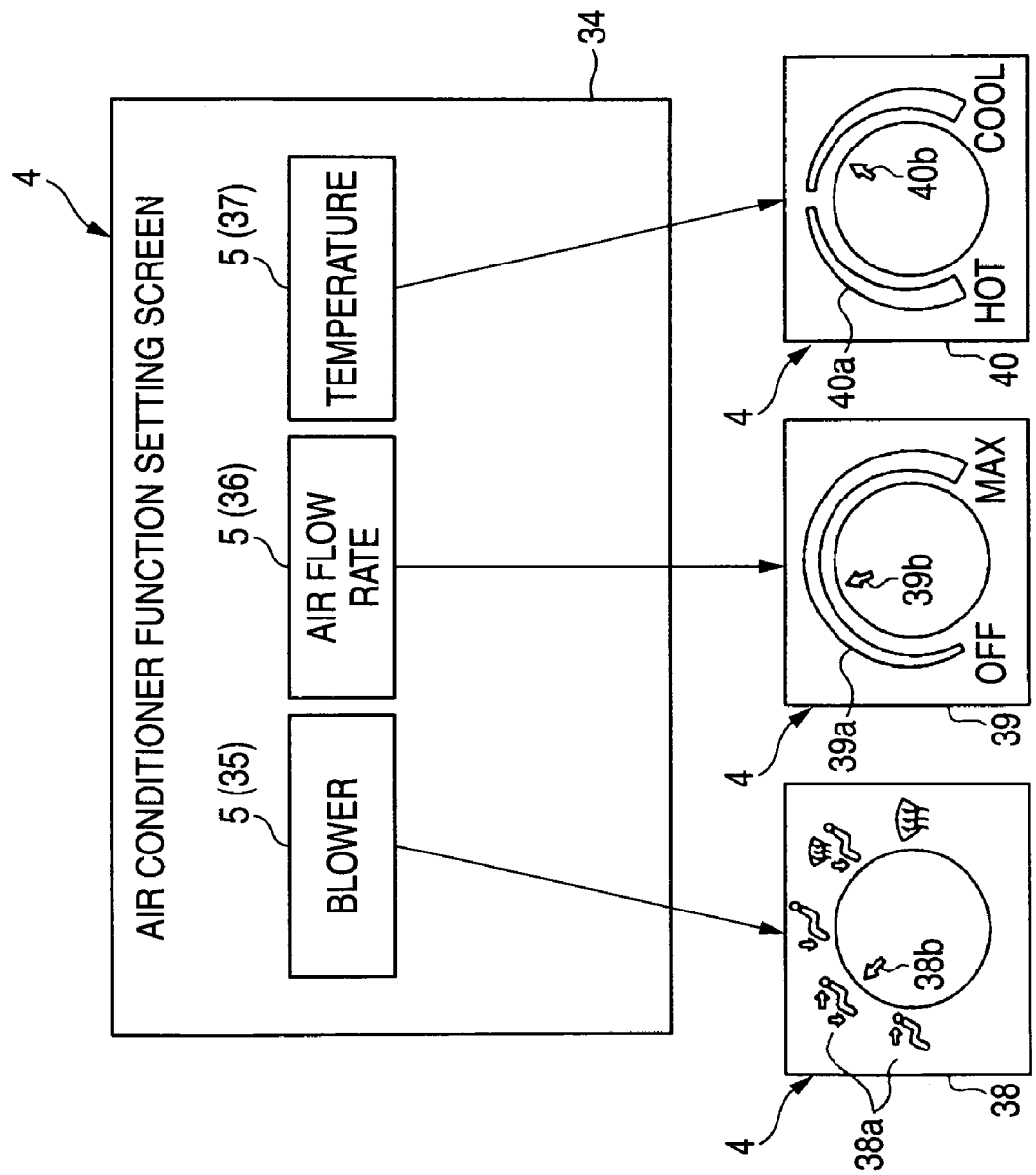
FIG. 8 is a view of an air conditioner function setting screen appearing on the display.

When the air conditioner function setting button 5a is subjected to selective determination operation on the menu screen 32, the switch controller 28 brings its own operation mode into an air conditioner function setting mode; displays on the display 4 an air conditioner function setting screen 34 shown in FIG. 8 as a detailed-function setting screen of the air-conditioner, and recognizes the control switch 7 as an air conditioner function switch. A blower button 35 selected at the time of switching of an air outlet, an air flow rate setting button 36 selected at the time of setting of an air flow rate, and an air blast temperature setting button 37 selected at the time of setting of the temperature of an air blast are assigned to the air conditioner function setting screen 34. In the present embodiment, the control switch 7 is assumed to serve as an unlimited rotational control switch even at the time of selective determination operation of the buttons 35 to 37.

When the blower button 35 is selectively designated on the air conditioner function setting screen 34, the switch controller 28 detected the button selection determination operation brings its own operation mode into a blower function setting mode; displays a blower setting screen 38 shown in FIG. 8 on the display 4; and recognizes the control switch 7 as a blower function setting switch. Blower function images 38a, 38a . . . corresponding to respective blower functions are displayed on the blower setting screen 38, and a blower function selected at that time is notified by means of the blower function image 38a on the screen being designated and displayed by an arrow 38b. When the selected state of the blower function is switched by means of rotational operation of the dial knob 10 at this time, the display position of the arrow 38b on the blower setting screen 38 is also switched and displayed according to the position of the thus selected and designated blower function.

In many cases, a common blower function setting switch is a rotational operation range limitation switch whose dial knob can be rotationally operated within only a given range. When the control switch 7 of the present embodiment is used for blower function setting purpose, it is preferable to impose a rotational operation limitation on the control switch 7 even in terms of a common usage pattern. Therefore, the switch controller 28 ascertains a blower function (a front outlet) located at one end of the dial knob 10 in the direction of rotational operation thereof and another blower function (a dehumidification function position) located another end of the dial knob in the direction of rotational operation thereof as dial knob stop positions, respectively. When the dial knob 10 is situated at either of the dial knob stop positions, the switch controller disables further rotational operation of the dial knob 10.

Namely, when the dial knob 10 arrived at the dial knob stop position, the switch controller 28 drives the rectilinear actuator 24 into lock and places the support member 25 attached to the drive shaft 24a at the lock position (the state shown in FIG. 4). In the locked state, when the base end is supported by the holding portion 25c as a result of the stopper 22 being lifted by means of the slope portion 25b, the stopper 22 enters a locked state where the vertical motion of the piece 18 is fixed. At this time, the piece 18 is fixed in the state the piece is engaged with the valley 15, and hence the dial knob 10 cannot perform any further rotational operation. Thus, the control switch 7 acts as the rotational operation range restriction switch.

Figure 9:
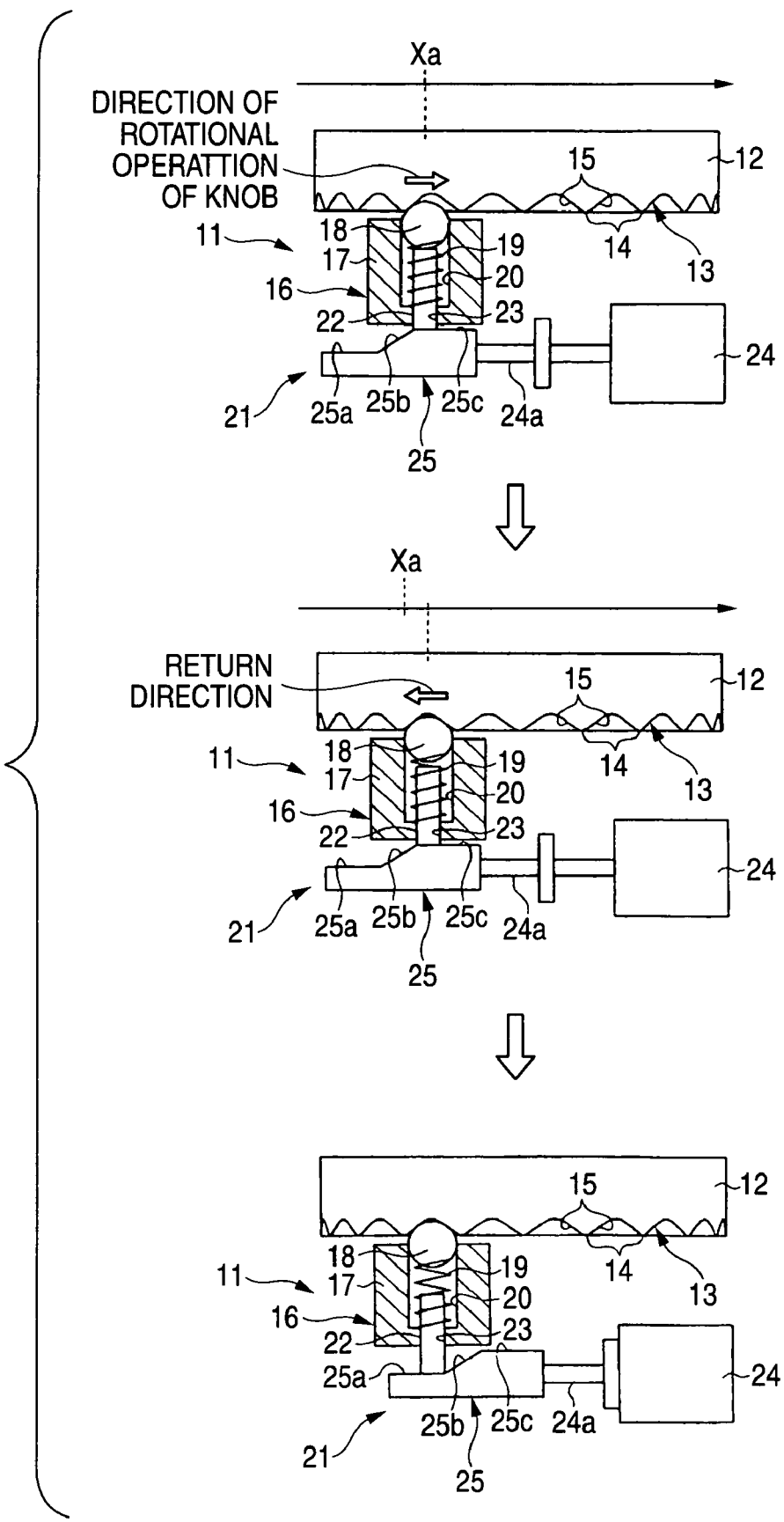
FIG. 9 is an explanatory view of operation performed when rotational operation of the dial knob is disabled.

As shown in FIG. 9, an actual dial knob stop position is set to a position Xa at any point on the slope of the crest 14 over which the piece 18 ascends. The reason for this is that, after the stopper 22 entered a locked state, the piece 18 slips down the slope of the crest 14 under the urging force of the urging member 19, to thus return the dial knob 10 by a mere amount and deviate the position of the dial knob 10 from the intermediate position Xa serving as the dial knob stop position, whereupon the stopper 22 is restored to the unlocked state. By means of such a configuration, even after the dial knob 10 entered the locked state as a result of arriving at the dial knob stop position, the dial knob 10 can be released from the locked state without problems, so that continued rotational operation of the dial knob 10 becomes possible.

When the air flow rate setting button 36 is selectively designated on the air conditioner function setting screen 34, the switch controller 28 detected the selective determination of the button brings its own operation mode into an air flow rate setting mode; displays an air flow rate setting screen 39 shown in FIG. 8 on the display 4; and recognizes the control switch 7 as a flow rate setting switch. A flow rate image 39a depicting a flow rate is displayed on the flow rate setting screen 39, and the amount of air flow selected at that time is notified as a result of the flow rate image 39a being designated and displayed by an arrow 39b at the set flow rate position. At this time, when the selected state of the air flow rate is switched by means of rotational operation of the dial knob 10, the display position of the arrow 39b on the flow rate setting screen 39 is also displayed while being switched according to the flow rate achieved after selective designation.

Since the flow rate setting switch of this type is also a rotational operation range restriction switch in general, the switch controller 28 sets the control switch 7 as a rotational operation range restriction switch at this time, as well. When the dial knob 10 has arrived at the dial knob stop position at this time, the rectilinear actuator 24 is driven into lock, thereby bringing the stopper 22 into the locked state and limit any further rotational operation of the knob. The range of rotational operation of the dial knob 10 achieved when the control switch 7 is used as a flow rate setting switch may also be identical with or different from that achieved when the control switch 7 is used as a blower function setting switch.

When the air blast temperature setting button 37 is selectively designated on the air conditioner function setting screen 34, the switch controller 28 detecting selective determination of the button brings its own operation mode into an air blast temperature setting mode; displays an air blast temperature setting screen 40 shown in FIG. 8 on the display 4; and recognizes the control switch 7 as an air blast temperature setting switch. An air blast temperature image 40a depicting the temperature of an air blast is displayed on the air blast temperature setting screen 40, and the temperature of the air blast selected at that time is notified as a result of the air blast temperature image 40a being designated and displayed by an arrow 40b at an air blast temperature setting position. At this time, when the selected state of the air blast temperature is switched by means of rotational operation of the dial knob 10, the display position of the arrow 40b on the air blast temperature setting screen 40 is also switched and displayed according to the temperature of the air blast achieved after selective designation.

Since the air blast temperature setting switch of this type is a rotational operation range restriction switch in general, as well, the switch controller 28 sets the control switch 7 as a rotational operation range restriction switch also at this time. When the dial knob 10 arrived at the dial knob stop position at this time, the rectilinear actuator 24 is driven into lock, thereby bringing the stopper 22 into a locked state and limit any further rotational operation of the knob. The range of rotational operation of the dial knob 10 achieved when the control switch 7 is used as an air blast temperature setting switch may be identical with or different from that achieved in the case of the blower function setting switch or the air blast temperature setting switch.

In the present embodiment, there is provided the operation restriction mechanism 21 that causes the vertically-movable stopper 22 attached to the plunger member 16 to be vertically moved by the rectilinear actuator 24, thereby switching the operating state of the stopper 22 between the locked state and the unlocked state. Hence, rotational operation of the dial knob 10 can be switched between an enabled state and a disabled state by use of the operation restriction mechanism 21. As a result, the control switch 7 that can be usually operated in an unlimited manner is disabled to effect rotation at an arbitrary position, whereby the control switch 7 can be caused to act as the rotational operation range restriction switch.

The operation restriction mechanism 21 of the present embodiment restricts the rotational operation of the dial knob 10 by means of pressing from back the piece 18, which serves as a constituent component of the detent mechanism 11, against the valleys 15 of the concave/convex pattern 13 through-use of the stopper 22, thereby fixing movements of the piece 18. Therefore, the valleys 15 of the detent mechanism 11 is shared between the detent mechanism 11 that imparts a click feeling to the dial knob 10 and the operation restriction mechanism 21 that stops rotational operation of the dial knob 10 at an arbitrary position. Consequently, even when the operation restriction mechanism 21 is incorporated into the control switch apparatus 3 of this type having the detent mechanism 11, the crested member 12 does not need to undergo, at the time of manufacture of the switch, special machining for an operation restriction mechanism. A hitherto-used detent crest member can be continually used as the crested member 12.

The configuration of the present embodiment enables yielding of advantages provided below.

(1) The operation restriction mechanism 21 of the present embodiment is a mechanism that restricts rotational operation of the crested member 12 by utilization of the valleys 15 serving as the constituent components of the detent mechanism 11 when the control switch 7 is used as the rotational operation range restriction switch, thereby stopping the dial knob 10 at an arbitrary stop position. Therefore, since the crested member 12 does not need to undergo, at the time of manufacture of the switch, special machining for an operation restriction mechanism to stop rotation of the crested member, a hitherto-used detent crest member can be continually used as the crested member 12.

(2) In the present embodiment, the operating direction (the direction of the arrow Rc in FIG. 3) of the rectilinear actuator 24 is orthogonal to the operating direction (the direction of the arrow Rb in FIG. 3) of the stopper 22. Hence, even if external force is exerted on the stopper 22 in a removal direction as a result of undue rotation of the dial knob 10 when the stopper 22 is in the locked state, the drive shaft 24a of the rectilinear actuator 24 assumes a position for firmly supporting the stopper 22. Therefore, even when external force is exerted on the stopper 22 in a removal direction while the stopper 22 remains in the locked state, the rectilinear actuator 24 can push the stopper 22 without fail, thereby making it difficult to cause unintended release of the stopper 22 from the locked state.

(3) The stopper 22 of the present embodiment is a component separate from the piece 18. Hence, constituent components, such as the stopper 22 and the actuator 24, that are constituent components of the operation restriction mechanism 21 can be embodied as common components regardless of the size of the piece 18; namely, the type of the plunger member 16. Accordingly, a necessity for preparing the operation restriction mechanism 21 according to different types of plunger components is obviated, and component cost required for the operation restriction mechanism 21 of this type can be curtailed.

(4) A GUI that displays various item buttons 5 on the display 4 and that performs button selection determination operation as a result of the button being selectively operated by use of the dial knob 10 is used for the control switch apparatus 3 of the present embodiment. Therefore, even when there is adopted a structure where one dial knob 10 is shared among a plurality of switch selection functions, an operator can be notified, in this case, of the range of operation of the dial knob 10 and selectable selection items acquired by means of the selection function that is in operation at that time. As a result, the operator can ascertain an operation position to which the control switch 7 can be actuated during operation, so that high operability of the control switch 7 can be ensured.

Second Embodiment

A second embodiment will now be described by reference to FIGS. 10 and 11. Since the second embodiment has the same configuration as that of the first embodiment except a change in the structure of the operation restriction mechanism 21 of the first embodiment. Hence, like elements are assigned like reference numerals, and their detailed explanations are omitted, and explanations are given solely to a difference between these embodiments.

Figure 10:
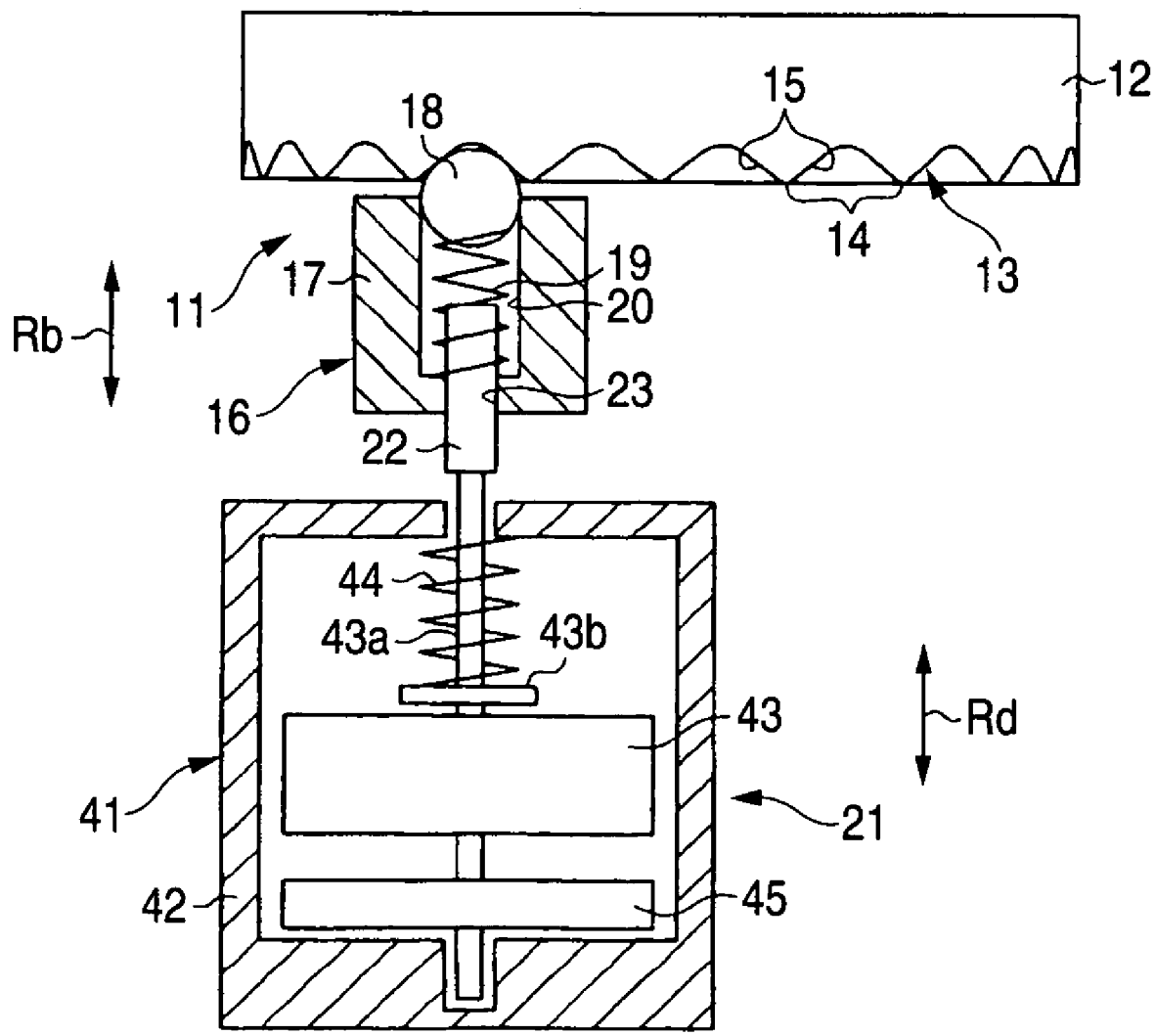
FIG. 10 is a partially-cutaway side view showing the general configuration of an operation restriction mechanism of a second embodiment.

As shown in FIG. 10, the control switch apparatus 3 is provided with an electromagnetic solenoid 41 as a drive component (a drive source) for the operation restriction mechanism 21. The electromagnetic solenoid 41 is provided with a solenoid case 42 for housing various types of solenoid components, and the solenoid case 42 is fixed to an interior wall surface of the switch case 9. An electromagnet (coil) 43 serving as a source for generating power of the electromagnetic solenoid 41 is provided in the solenoid case 42. A movable shaft 43a shaped approximately like a rod is attached to the electromagnet 43 so as to be able to perform reciprocal linear motion in an operating direction (the direction of arrow Rd in FIG. 10) aligned to the direction of travel of the piece 18. The stopper 22 that presses and fixes from back the piece 18 against an extremity of the movable shaft 43a is fastened integrally to the extremity. The electromagnetic solenoid 41 corresponds to a parallel rectilinear actuator.

An urging member 44 that urges at all times the movable shaft 43a in a direction departing from the piece 18 is interposed between a seat portion 43b of the movable shaft 43a and an interior wall surface of the solenoid case 42. For instance, a metal member 45 shaped approximately like a disc is fixed to a position close to the lower end of the movable shaft 43a so as to be movable in conjunction with the movable shaft 43a. The electromagnetic solenoid 41 assumes two states; namely, a locked state where, when energized, the electromagnet 43 attracts the metal member 45, thereby pressing the piece 18 by means of the stopper 22, and an unlocked state where, when energization of the electromagnet 43 is turned off, the movable shaft 43a descends under the urging force of the urging member 44, thereby releasing the piece 18 whose position is restricted by the stopper 22. The electromagnet 43 corresponds to an excitation coil, and the metal member 45 corresponds to movable metal.

When the control switch 7 is used as an unlimited rotational control switch, the switch controller 28 turns off energization of the electromagnet 43 of the electromagnetic solenoid 41 at all times regardless of the position of rotational operation of the dial knob 10, whereby the movable shaft 43a is pressed down in a direction opposite to the piece under the urging force of the urging member 44 in the electromagnetic solenoid 41. At this time, the stopper 22 departs from the piece 18, to thus enter an unlocked state. Hence, motion of the piece 18 is enabled, and the dial knob 10 is enabled to perform, in the rotational direction thereof, rotational operation over the entire range.

Figure 11:
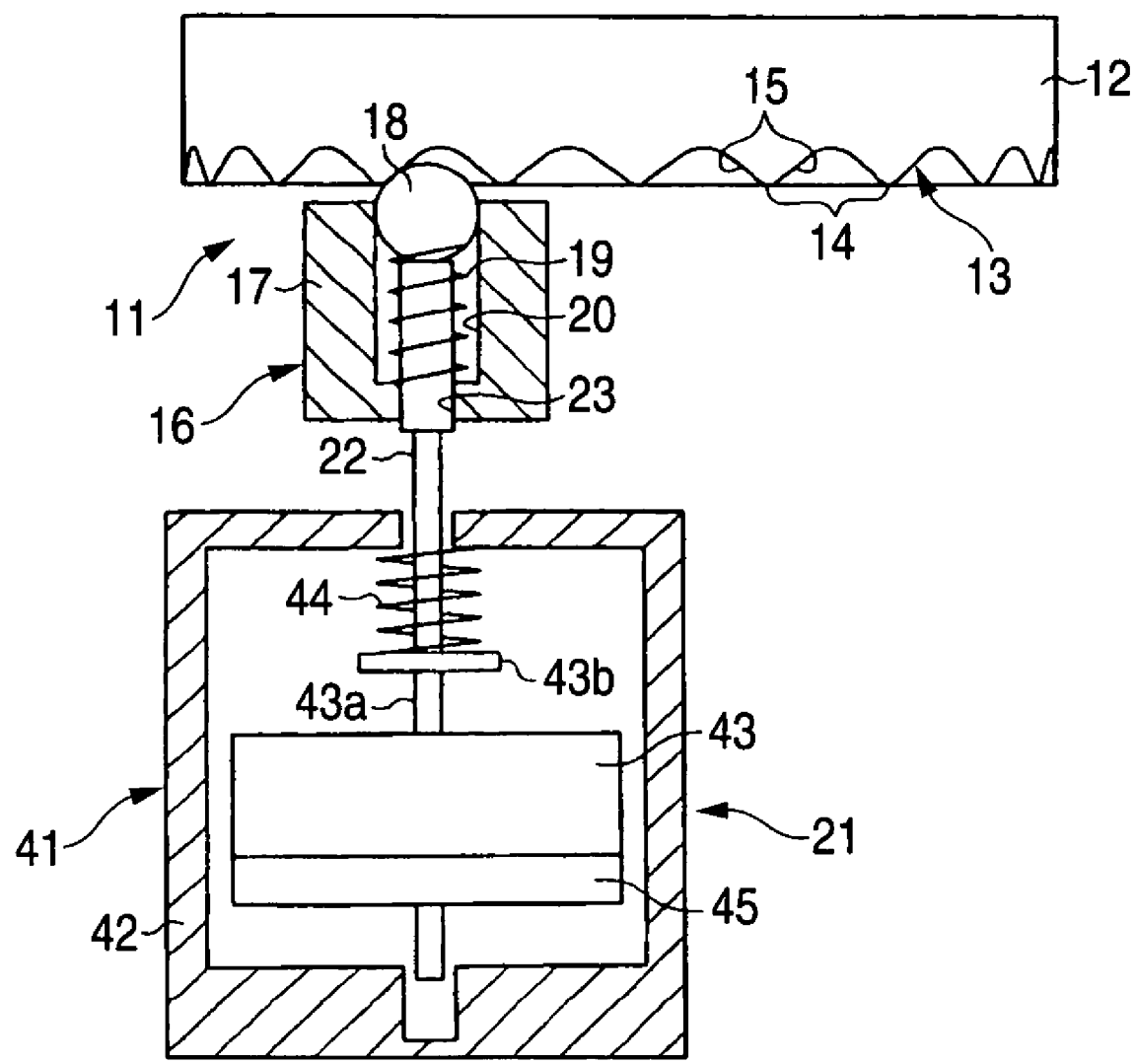
FIG. 11 is a partially-cutaway side view showing the operation restriction mechanism achieved when the operation of the dial knob is disabled.

In a case where the control switch 7 is used as a rotational operation range restriction switch, when the position of rotational operation of the dial knob 10 comes to a dial knob stop position, the switch controller 28 energizes the electromagnet 43 of the electromagnetic solenoid 41 at this timing as shown in FIG. 11, so that the electromagnet 43 attracts the metal member 45 by means of electromagnetic force of the electromagnet 43, to thus raise the movable shaft 43a toward the piece 18 against the urging force of the urging member 44. Thereby, the stopper 22 presses the piece 18, to thus hold the piece 18 in a stationary state. The dial knob 10 cannot perform any further rotational operation, such that the control switch 7 acts as a rotational operation range restriction switch.

In addition to yielding the advantages defined in (1), (3), and (4) of the first embodiment, the configuration of the present embodiment enables yielding of the following advantages.

(5) In the present embodiment, the operating direction (the direction of the arrow Rd in FIG. 10) of the electromagnetic solenoid 41 and the operating direction (the direction of the arrow Rb in FIG. 10) of the stopper 22 are concentric with each other. Hence, even if external force is exerted on the stopper 22 in a removal direction as a result of undue rotation of the dial knob 10 when the stopper 22 is in the locked state, the electromagnetic solenoid 41 is released as a result of imparting of external force of attracting force or more of the electromagnet 43, whereupon the stopper 22 moves so as to become unlocked. Therefore, even when external force is exerted on the stopper 22 while the stopper 22 remains in the locked state, the stopper 22 is removed at this time. As a result, the stopper 22 and the concave/convex pattern 13 become less vulnerable to excessive load, so that the stopper 22 and the crested member 12 can be made less susceptible to fracture.

Third Embodiment

A third embodiment will now be described by reference to FIGS. 12 and 13. Since the third embodiment has the same configuration as that of the first embodiment except a change in the structure of the operation restriction mechanism 21 of the first embodiment. Hence, even in the present embodiment explanations are given solely to a difference between these embodiments.

Figure 12:
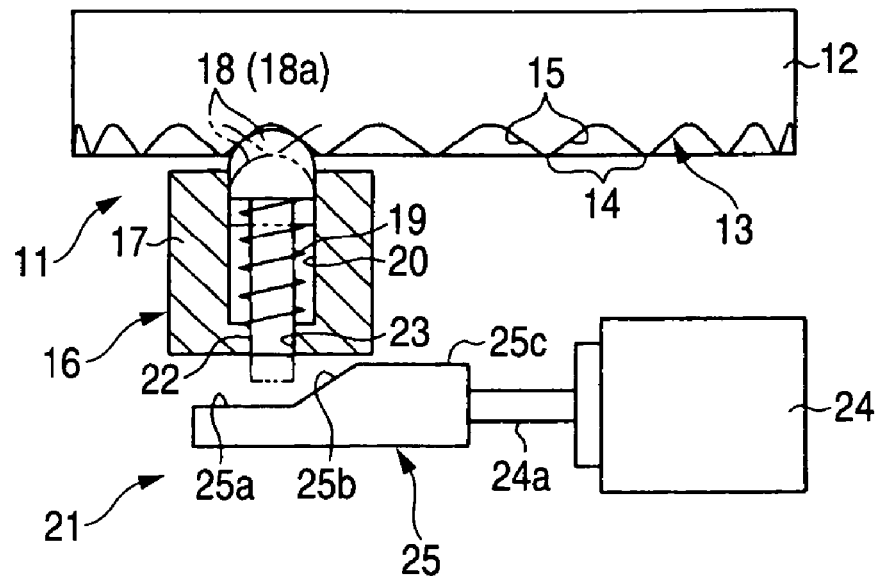
FIG. 12 is a partially-cutaway side view showing the general configuration of an operation restriction mechanism of a third embodiment.

As shown in FIG. 12, the piece 18 and the stopper 22 of the present embodiment are built as a stopper-equipped detent piece 18a (hereinafter called simply "stopper-equipped piece") in which the piece 18 and the stopper 22 are integrally assembled together. The stopper-equipped piece 18a of the present embodiment is attached to the plunger case 17 while being able to reciprocally move along the urging direction of the urging member 19. In a case where the stopper-equipped piece 18a is not locked when the dial knob 10 is rotationally operated, the stopper-equipped piece 18a of stopper-integrated type makes motion for getting over the crest 14 against the urging force of the urging member 19 as indicated by a two-dot chain line shown in FIG. 12. Resisting force originating every time the stopper-equipped piece 18a gets over the crest 14 is imparted as a click feeling of the dial knob 10 to the operator.

In a case where the control switch 7 is used as an unlimited rotatable control switch, the switch controller 28 holds the rectilinear actuator 24 in a state where the drive shaft 24a of the actuator is withdrawn into the actuator, regardless of the position of rotational operation of the dial knob 10, thereby placing the support member 25 provided at the extremity of the drive shaft 24a at the unlock position separated from the stopper-equipped piece 18a. At this time, the stopper-equipped piece 18a is brought into an unlocked state where the movement of the piece is not restricted by the support member 25. Therefore, the motion of the stopper-equipped piece 18a is enabled without regard to the position of rotational operation of the dial knob 10, so that the dial knob 10 is enabled to perform in the rotational direction thereof rotational operation over the entire range.

Figure 13:
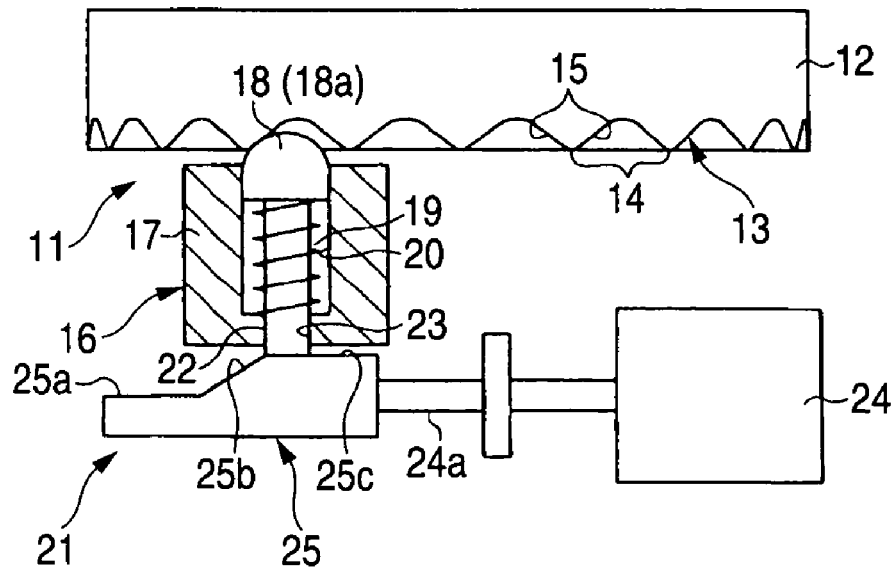
FIG. 13 is a partially-cutaway side view showing the operation restriction mechanism achieved when the operation of the dial knob is disabled.

In the meantime, in a case where the control switch 7 is used as a rotational operation range restriction switch, when the position of rotational operation of the dial knob 10 comes to a dial knob stop position, the switch controller 28 drives the rectilinear actuator 24 at this timing into a state where the drive shaft 24a is extended away from the actuator as shown in FIG. 13, thereby moving the support member 25 located at the extremity of the drive shaft 24a toward the stopper-equipped piece 18a so as to be located at the lock position. At this time, the stopper-equipped piece 18a enters a locked state where the motion of the piece is restricted by the support member 25, so that the dial knob 10 cannot perform any further rotational operation. Accordingly, the control switch 7 acts as a rotational operation range restriction switch.

In addition to yielding the advantages defined in (1), (2), and (4) of the first embodiment, the configuration of the present embodiment enables yielding of the following advantages.

(6) The present embodiment uses the stopper-equipped piece 18a in which the piece 18 and the stopper 22 are integrally assembled together. Hence, at the time of assembly of the piece and a group of articles of a stopper member, the components are assembled by means of single assembly operation. Therefore, the ease of assembly of components can be enhanced in association as the number of processes is decreased.

(7) In the present embodiment, when the piece 18 is brought into a stationary state, the stopper 22 kept when the piece 18 and the stopper 22 are separate components does not ascend to come into contact with the piece 18. When the piece 18 and the stopper 22 are separate from each other, there is a potential risk of the stopper 22 coming into contact with the piece 18 when the piece 18 enters a locked state, thereby generating impact sound. However, in the case of the integrated structure as described in the present embodiment, the motion of the stopper 22 is not required, and hence the potential of generation of impact sound of this type can be eliminated.

Fourth Embodiment

A fourth embodiment will now be described by reference to FIGS. 14 and 15. Since the fourth embodiment has the same configuration as that of the second embodiment except a change in the structure of the electromagnetic solenoid 41 of the second embodiment. Hence, even in the present embodiment explanations are given solely to a difference between these embodiments.

Figure 14:
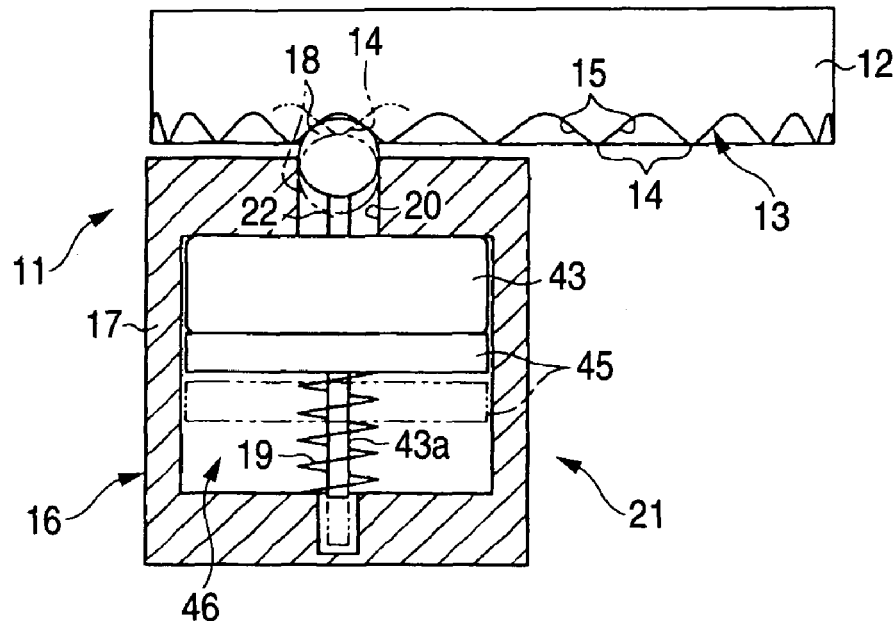
FIG. 14 is a partially-cutaway side view showing the general configuration of an operation restriction mechanism of a fourth embodiment.

As shown in FIG. 14, the plunger member 16 of the present embodiment is built as a single component into which the electromagnetic solenoid 41 and the plunger member 16 of the second embodiment are assembled together, by means of incorporating the solenoid mechanism 46 into the plunger case 17. In this plunger member 16, the electromagnet 43, the movable shaft 43a, and the metal member 45 are housed in the plunger case 17 and attached in such a way that the extremity of the movable shaft 43a acts as the stopper 22, to thus come into contact with the piece 18. In the plunger member 16, the urging member 19 for bringing the piece 18 into elastic contact with the concave/convex pattern 13 is interposed between the interior wall surface of the plunger case 17 and the bottom surface of the metal member 45. The urging member 19 achieved at this time corresponds to a solenoid-side urging member, and the solenoid mechanism 46 constitutes a solenoid.

The crest 14 pushes the piece 18 during rotational operation of the dial knob 10 as indicated by a two-dot chain line shown in FIG. 14. The movable shaft 43a (including the metal member 45 also) is depressed against the urging force of the urging member 19 by means of pushing operation, whereupon the piece 18 makes a motion so as to get over the crest 14. Resisting force originating every time the piece 18 gets over the crest 14 is imparted as a click feeling of the dial knob 10 to the operator at the time of rotational operation of the dial knob 10.

In a case where the control switch 7 is used as an unlimited rotatable control switch, the switch controller 28 turns of energization of the electromagnet 43 of the solenoid mechanism 46 at all times, regardless of the position of rotational operation of the dial knob 10, thereby holding the electromagnet 43 and the metal member 45 in a non-attracting state and enabling vertical motion of the movable shaft 43a at all times. At this time, the stopper 22 serving as the extremity of the movable shaft 43a is brought into the unlocked state in association with enabling of vertical motion of the movable shaft 43a. Therefore, the motion of the piece 18 is enabled regardless of the position of rotational operation of the dial knob 10, and the dial knob 10 is enabled to perform, in the rotational direction thereof, rotational operation over the entire range.

Figure 15:
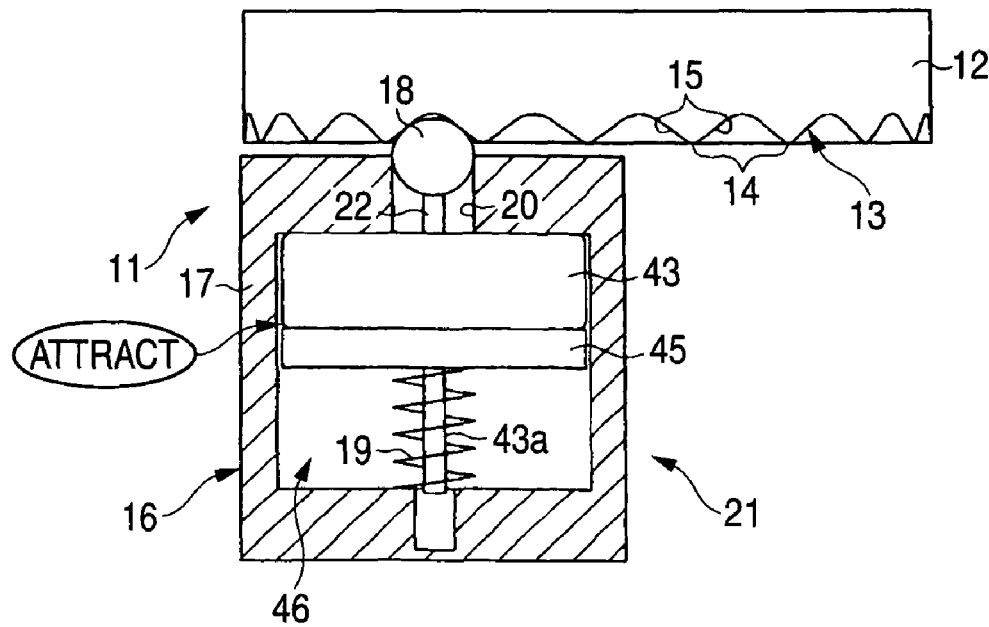
FIG. 15 is a partially-cutaway side view showing the operation restriction mechanism achieved when the operation of the dial knob is disabled.

In the meantime, in a case where the control switch 7 is used as a rotational operation range restriction switch, when the position of rotational operation of the dial knob 10 comes to a dial knob stop position, the switch controller 28 energizes the electromagnet 43 of the electromagnetic solenoid 41 at this timing as shown in FIG. 15, thereby causing the electromagnet 43 to attract the metal member 45 by means of electromagnetic force of the electromagnet 43. As a result, the movable shaft 43a enters a stationary state, and its vertical motion is restricted. The piece 18 is fixed while being engaged with the valley 15. Therefore, further rotational operation of the dial knob 10 from the stop position is disabled, and the control switch 7 can be used as the rotational operation range restriction switch.

In addition to yielding the advantages defined in (1), (3), and (4) of the first embodiment and the advantage defined in (5) of the second embodiment, the configuration of the present embodiment enables yielding of the following advantages.

(8) In the present embodiment, the plunger member 16 and the electromagnetic solenoid 41 are built as a single component. Hence, an attempt is made to share the use of a group of components, such as cases, between these two components. Consequently, the number of constituent components of the operation restriction mechanism 21 is curtailed as a result of share use of the components. Hence, a component accommodation space required arranging the plunger member 16 and the electromagnetic solenoid 41 in the switch case 9 becomes smaller, and the control switch apparatus 3 can be miniaturized.

(9) The metal member 45 that is attracted by the electromagnet 43 so as to bring the stopper 22 into a locked state at the time of energization of the electromagnet 43 stays at the same position regardless of whether energization of the electromagnet 43 is turned on or off. Therefore, the metal member 45 being attracted by the electromagnet 43, to thus move toward the electromagnet 43 at the time of energization of the electromagnet 43, such as that in the second embodiment, is obviated. Concerns about generation of impact sound, which would otherwise be caused when the metal member 45 contacts the electromagnet 43, are eliminated.

(10) The metal member 45 is situated at the same location when the stopper 22 enters a locked state as a result of the electromagnet 43 being energized and when the stopper 22 enters an unlocked state as a result of energization of the electromagnet 43 being turned off. Since the metal member 45 is not moved when the stopper 22 is switched between the locked state and the unlocked state, the stopper 22 can be momentarily switched between the locked state and the unlocked state.

Fifth Embodiment

A fifth embodiment will now be described by reference to FIGS. 16 and 17. Since the fifth embodiment has the same configuration as that of the first embodiment except a change in the structure of the operation restriction mechanism 21 of the first embodiment. Hence, even in the present embodiment explanations are given solely to a difference between these embodiments.

Figure 16:
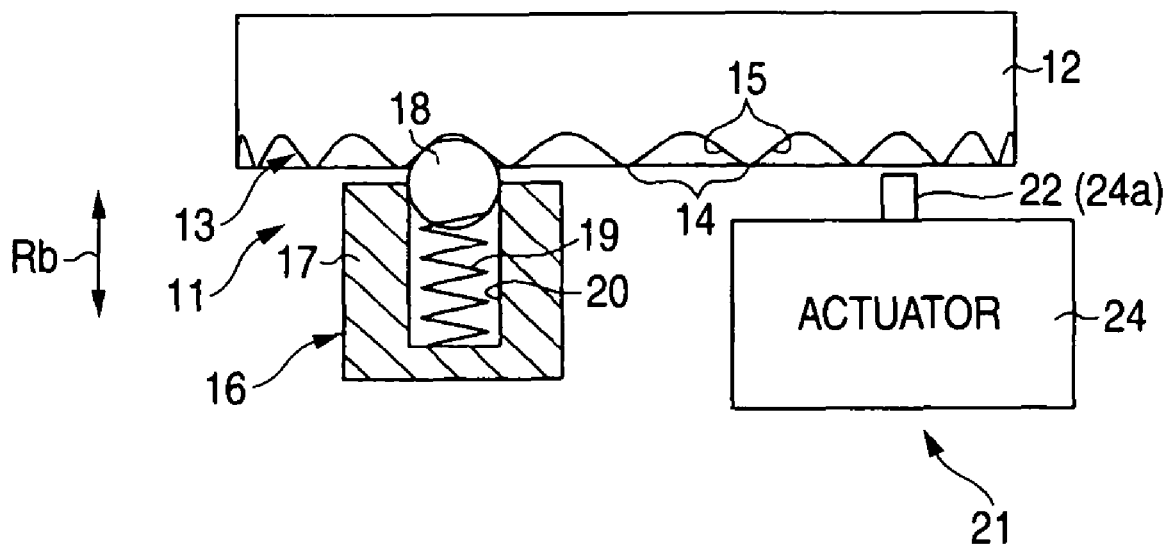
FIG. 16 is a partially-cutaway side view showing the general configuration of an operation restriction mechanism of a fifth embodiment.

As shown in FIG. 16, the operation restriction mechanism 21 of the present embodiment is configured as a component separate from the plunger member 16. The operation restriction mechanism is placed at a position where it opposes the concave/convex pattern 13 of the crested member 12. The operation restriction mechanism 21 can reciprocally, linearly move the drive shaft 24a while taking the rectilinear actuator 24 as a drive source, and the extremity of the drive shaft 24a acts as the stopper 22. The rectilinear actuator 24 of the present embodiment is arranged in a direction where the direction of linear motion of the stopper 22 (i.e., the drive shaft 24a) becomes parallel to the urging direction (the direction of the arrow Rb in FIG. 16) of the urging member 19 of the plunger member 16. The valley 15 achieved at this time corresponds to an indentation portion, and the stopper 22 constitutes a stopper member (a direct stopper member).

When the control switch 7 is used as an unlimited rotational control switch, the switch controller 28 holds the drive shaft 24a of the rectilinear actuator 24 in a position withdrawn into the actuator, regardless of the position of rotational operation of the dial knob 10, and the stopper 22 acting as the extremity of the drive shaft 24a is brought into an unlocked state where the stopper is not engaged with the valley 15 of the crested member 12. At this time, the motion of the piece 18 is enabled regardless of the position of rotational operation of the dial knob 10, and the dial knob 10 is enabled to perform, in the rotational direction thereof, rotational operation over the entire range.

Figure 17:
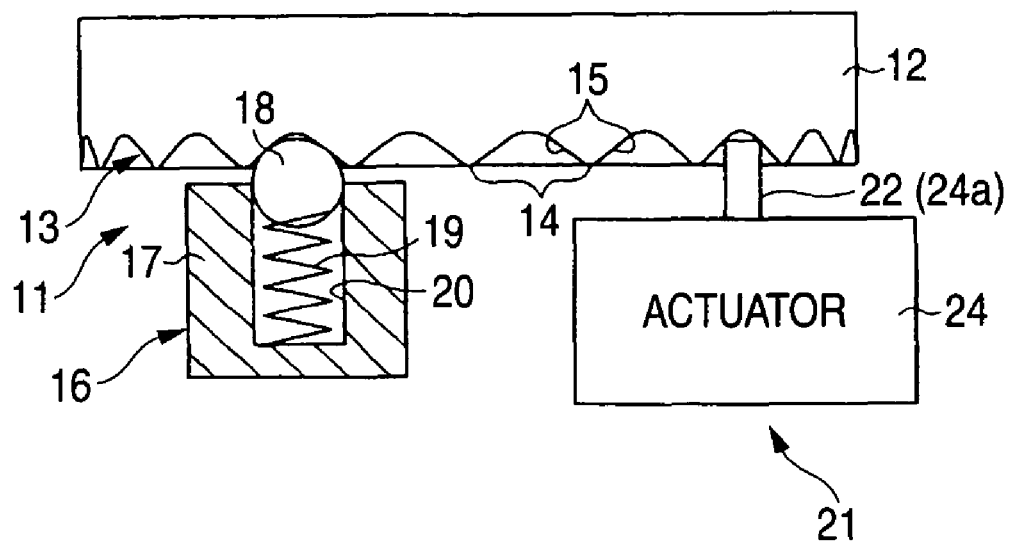
FIG. 17 is a partially-cutaway side view showing the operation restriction mechanism achieved when the operation of the dial knob is disabled.

In a case where the control switch 7 is used as a rotational operation range restriction switch, when the position of rotational operation of the dial knob 10 comes to a dial knob stop position, the switch controller 28 drives at this timing the rectilinear actuator 24 into a state where the drive shaft 24a is withdrawn, as shown in FIG. 17. At this time, the stopper 22 enters a locked state where the stopper is engaged with the valley 15 of the crested member 12, thereby restricting rotational operation of the dial knob 10. Therefore, the dial knob 10 cannot perform any further rotational operation from the dial knob stop position, and hence the control switch 7 can be used as the rotational operation range restriction switch.

In addition to yielding the advantages defined in (1), (3), and (4) of the first embodiment, the configuration of the present embodiment enables yielding of the following advantages.

(11) The operation restriction mechanism 21 of the present embodiment is a component separate from the plunger member 16. Hence, the operation restriction mechanism can be embodied by means of attaching the operation restriction mechanism 21 to the existing control switch 7 at the time of practice of the present invention. A significant change in the design of the control switch 7 is not involved at the time of practice of the invention.

The present embodiments are not limited to the configurations mentioned above and may also be modified as follows:

In the first through fifth embodiments, the actuator serving as a drive source when the stopper 22 is switched to the locked state or the unlocked state is not necessarily limited to an actuator of rectilinear type in which the drive shaft 24a of the actuator performs reciprocal linear motion. For instance, a rotatable actuator in which the drive shaft 24a performs rotational motion may also be adopted.

In the first through fifth embodiments, either a solenoid or a motor may be adopted as the actuator serving as the drive source for switching the locked state of the stopper 22, or another drive source may also be adopted.

In the first through fifth embodiments, the direction of arrangement of the actuator (solenoid) may also be oriented in a direction where the operating direction of the drive shaft becomes orthogonal to the operating direction of the stopper 22 or crosses the same.

In the first through fifth embodiments, the present invention is not limited to the configuration in which the crested member 12 is attached to the dial knob 10 and in which the plunger member 16 is attached to the switch case 9. The relationship between the combinations may also be reversed.

In the first through fifth embodiments, the layout and position of the plunger member 16 are not necessarily limited to a position below the crested member 12. Specifically, so long as the concave/convex pattern 13 of the crested member 12 is formed on an upper surface of a plate material, the plunger member 16 may also be positioned at a place above the crested member 12. Alternatively, so long as the concave/convex pattern 13 of the crested member 12 is formed on a side surface of the plate material, the plunger member 16 may also be positioned on the lateral side of the crested member 12.

Figure 18:
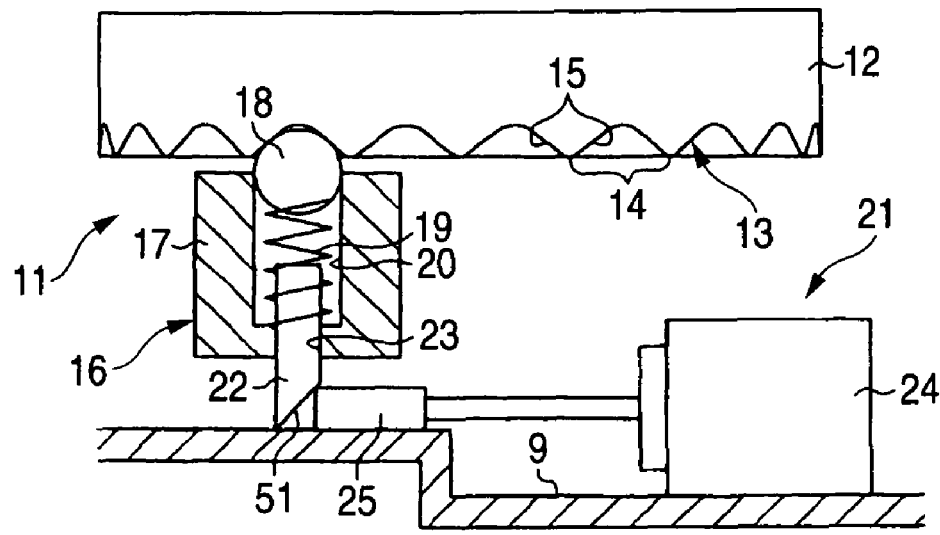
FIG. 18 is a partially-cutaway side view showing the general configuration of an operation restriction mechanism of another example.

In the first and third embodiments, a conversion mechanism for converting lateral linear motion of the rectilinear actuator 24 into vertical linear motion of the stopper 22 is not limited to the support member 25 attached to the drive shaft 24a of the rectilinear actuator 24. For instance, as shown in FIG. 18, there may also be adopted a structure in which a slope portion 61 is provided at the lower end of the stopper 22 and in which the stopper 22 is lifted along the slope portion 51 when the extremity of the support member 25 is inserted. Here, the slope portion 51 constitutes converter.

Figure 19:
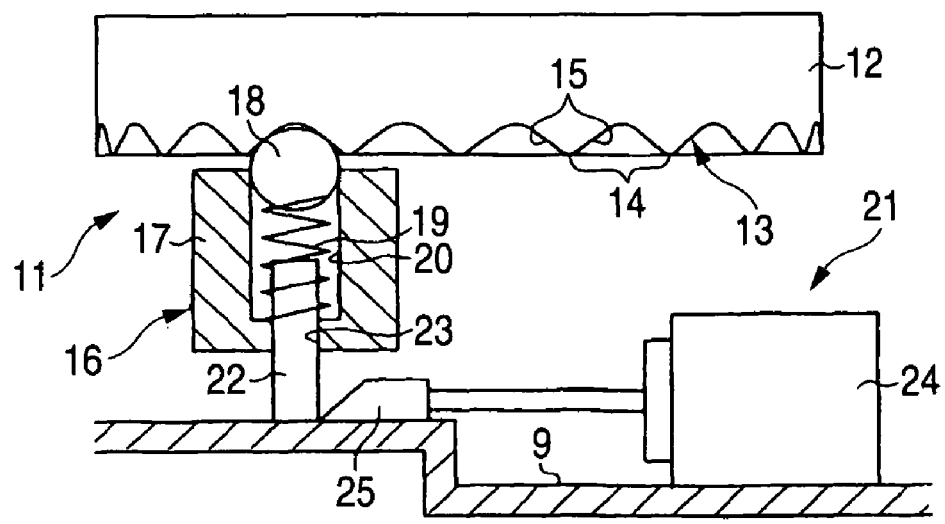
FIG. 19 is a partially-cutaway side view showing the general configuration of an operation restriction mechanism of yet another example.

In the first and third embodiments, the stopper 22 that stops movement of the piece 18 is not limited to the structure in which, when in the unlocked state, the stopper is always supported by the support member 25. For instance, as shown in FIG. 19, there may also be adopted a structure in which, when in the unlocked state, the stopper 22 is supported by an interior wall surface of the switch case 9.

In the second embodiment, the urging member 44 for urging the movable shaft 43a (the stopper 22) in a direction opposite to the crested member is not always necessary and may also be omitted. An urging member for urging the metal member 45 toward the crested member 12 may also be interposed between an interior surface of the case and the metal member 45 within the solenoid case 42.

Figure 20:
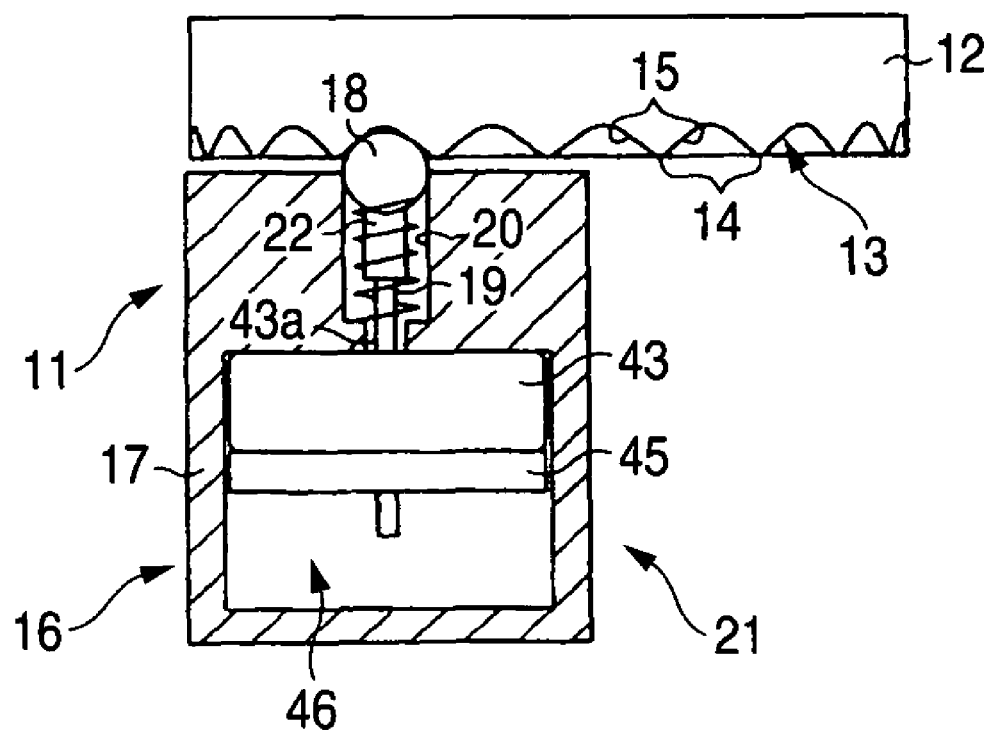
FIG. 20 is a partially-cutaway side view showing the general configuration of an operation restriction mechanism of still another example.

In the fourth embodiment, the urging member 19 for bringing the piece 18 into elastic contact with the concave/convex pattern 13 of the crested member 12 is not always limited to the position sandwiched between the interior wall surface of the plunger case 17 and the lower surface of the metal member 45. For instance, as shown in FIG. 20, the urging member 19 may also be interposed between the rear surface of the piece 18 and the interior wall surface of the plunger case 17. Moreover, the urging member 19 of this type may also be interposed between a position between the interior wall surface of the plunger case 17 and the lower surface of the metal member 45 and a position between the rear surface of the piece 18 and the interior wall surface of the plunger case 17.

In the first through fourth embodiments, the piece and the stopper 22 assume the form of separate components, and the piece 18 and the stopper 22 assume the form of a single piece. These forms can be changed freely, as required, according to the usage pattern.

In the first through fifth embodiments, the piece 18 is not always limited to a spherical shape. For instance, the piece 18 may also assume; for example, a shape having a removal prevention portion for preventing removal of the piece from the plunger case 17.

In the first through fifth embodiments, switching of operation of the control switch 7 between an enabled state and a disabled state is not limited to processing for performing switching according to the position of rotational operation of the dial knob 10. For instance, there may also be adopted processing for disabling rotational operation of the dial knob 10 when the display screen of the display 4 has changed to an operation disabled screen for disabling operation of the dial knob 10. Moreover, for example, when the display 4 is of a touch panel type, rotational operation of the dial knob 10 may also be switched between an enabled state and a disabled state according to operation of the touch panel.

In the first through fifth embodiments, the control switch 7 is not limited to a switch of a rotational operation type in which the dial knob 10 serving as an element to be operated is rotated in the rotational direction. The control switch may also be; for example, a switch of a slide operation type in which an element to be operated is slid in a lateral direction.

In the first through fifth embodiments, the control switch apparatus 3 of the present embodiment is not always limited to a switch to be mounted on a vehicle. For instance, so long as the switch has an operation system as with; for example, an electrical appliance, an object on which the switch is to be mounted is not limited particularly.

Sixth Embodiment

Next, a sixth embodiment of the present invention will be described. This sixth embodiment has the same structure as the first embodiment, and so, members corresponding to those members in the first embodiment are denoted with the same reference numerals, and their detailed description will be omitted.

A hole 21 which brings the housing portion 20 into mutual communication with the outside of the case is drilled through a bottom wall of the plunger case 17. A movable member 22 supporting the urging member 19 from one end is attached to the hole 21 so as to be able to relatively move along an urging direction of the urging member 19. A removal prevention portion 22a, which is larger in diameter than a remaining area in order to prevent removal of the movable member 22 from the plunger case 17, is formed at a part of the movable member 22 located inside the housing portion 20.

Figure 21:
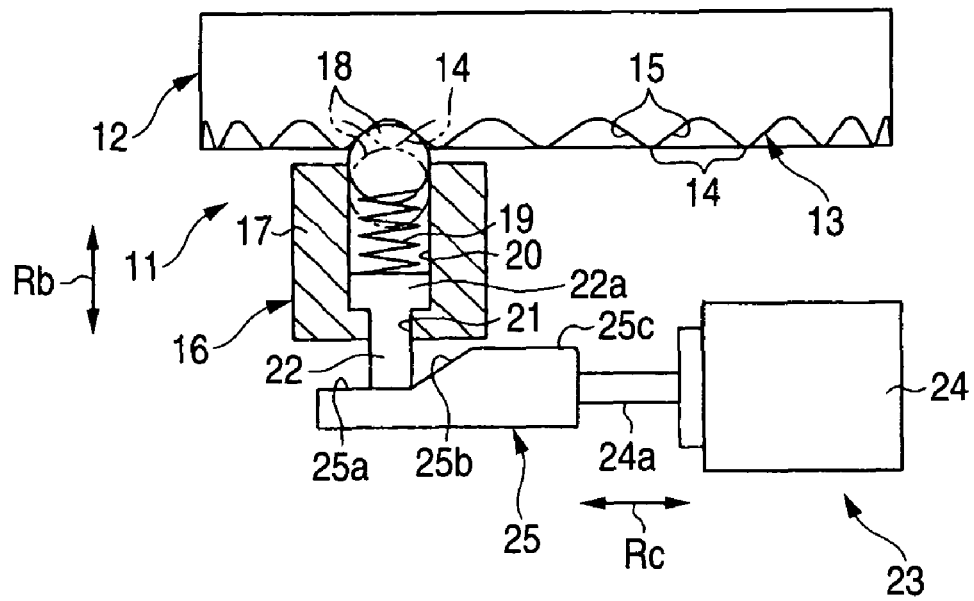
FIG. 21 is a partially-cutaway side view showing an operation restriction mechanism achieved when a dial knob is set to a low click feeling level.
Figure 22:
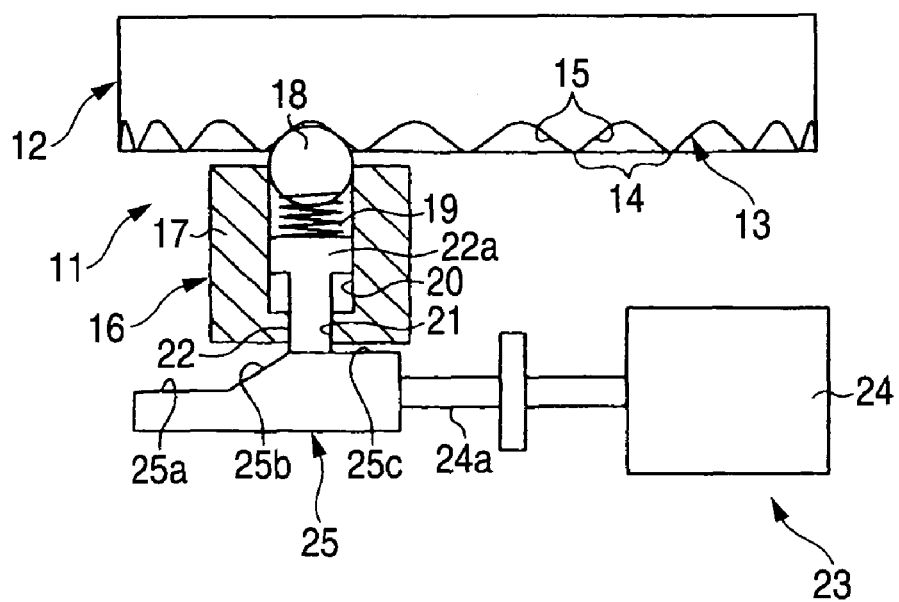
FIG. 22 is a partially-cutaway side view showing the operation restriction mechanism achieved when the dial knob is set to a high click feeling level.

As shown in FIGS. 2, 21 and 22, the control switch apparatus 3 is provided with a detent changeover mechanism 23 that switches the intensity of a click feeling developing in the dial knob 10 at the time of rotational operation of the dial knob 10. In the following descriptions about the detent changeover mechanism 23, a rectilinear actuator 24 acting as a drive source for the detent changeover mechanism 23 is housed in the switch case 9. The rectilinear actuator 24 is an actuator which outputs driving force in the form of reciprocal linear motion of the drive shaft 24a. For instance, a motor mechanism, or the like, that converts rotational force of an electromagnetic solenoid or a motor (a DC motor) into linear motion of the drive shaft 24a and outputs the linear motion, is used as a drive source for the rectilinear actuator. The rectilinear actuator 24 is mounted transversely with respect to the urging direction of the urging member 19; namely, with respect to the operation shaft 10b of the dial knob 10, in such a way that a drive shaft 24a of the actuator performs reciprocal linear motion in a direction (i.e., a direction of arrow Rc in FIG. 21) crossing at right angles the urging direction of the urging member 19. The rectilinear actuator 24 constitutes an actuator and a cross rectilinear actuator.

As shown in FIGS. 2, 5, 21 and 22, a support member 25 that supports from below the movable member 22 attached to the plunger member 16 is fixedly attached to an extremity of the drive shaft 24a of the rectilinear actuator 24. The rectilinear actuator 24 reciprocally actuates the support member 25 attached to the drive shaft 24a along a direction orthogonal to the urging direction of the urging member 19, thereby reciprocally, linearly actuating the support member 25 between two positions in the sixth embodiment; namely, a soft click feeling position (a state shown in FIG. 21) where a click feeling developing in the dial knob 10 is set so as to become soft and an intensive click feeling position (a state shown in FIG. 22) where the click feeling developing in the dial knob 10 is set so as to become hard. The support member 25 constitutes the actuator and the converter.

A lower level portion 25a that supports the movable member 22 at a low position, to thus set the click feeling developing in the dial knob 10 so as to become soft is formed at a position close to the extremity of the support member 25. A slope portion 25b that pushes the movable member 22 located at the low level portion 25a higher when the support member 25 is linearly actuated in its protruding direction by the rectilinear actuator 24 is formed at the center position of the support member 25. A high level portion 25c is formed at a position close to a base end of the support member 25, wherein the portion holds the movable member 22 pushed by means of the slope portion 25b at a position higher than the low level portion 25a, thereby setting the click feeling developing in the dial knob 10 so as to become hard.

When supported by the low level portion 25a of the support member 25, the movable member 22 comes to a lower position, whereby the urging member 19 becomes extended. Therefore, the urging force of the urging member 19 that presses the piece 18 is set to a low level, and the piece 18 comes into elastic contact with the concave/convex pattern 13 under weak force, whereupon soft click feeling develops in the dial knob 10. In the meantime, when the movable member 22 is supported by the high level portion 25c of the support member 25, the urging member 19 is squeezed and contracted by the movable member 22. Therefore, the urging force of the urging member 19 that presses the piece 18 is set to a high level, and the piece 18 comes into elastic contact with the concave/convex pattern 13 under strong force. Hence, hard click feeling develops in the dial knob 10.

As shown in FIG. 2, an encoder 27 that detects the amount of rotation (the number of rotations) of the dial knob 10 is attached to a lower end of the operation shaft 10b of the dial knob 10. The encoder 27 is made up of; for example, a pulse encoder that outputs a value of detected rotation in the form of a pulse signal. At the time of detection of rotation of the dial knob 10, the encoder can output a detection signal having the number of pulses corresponding to the amount of rotation of the dial knob 10 achieved at that time. The determination switch 7a, the return switch 7b, and the encoder 26 constitutes detector.

In accordance with various operations performed by the operator at the time of operation of the dial knob 10, the switch controller 28 controls and drives the rectilinear actuator 24, thereby vertically moving the movable member 22 by way of the support member 25, to thus change settings of the urging force F of the urging member 19 and control switching of the click feeling developing in the dial knob 10. Namely, when perceived that the display screen of the display 4 and the position of rotational operation of the dial knob 10 have entered a state where a soft click feeling is caused to develop in the dial knob 10, the switch controller 28 withdraws the drive shaft 24a of the rectilinear actuator 24, to thus lower the movable member 22 and set the click feeling to a soft level. In the meantime, when perceived that a state where a hard click feeling is caused to develop in the dial knob 10 is achieved, the switch controller 27 withdraws the drive shaft 24a of the rectilinear actuator 24, to thus lift the movable member 22 and set the click feeling to a hard level. The switch controller 28 corresponds to controller.

Incidentally, in the control switch apparatus 3 of the sixth embodiment in which one control switch 7 is shared among a plurality of selection functions, an object of selection and a selection item change from one selection function to another (including a display screen and a knob rotation position, as well). Therefore, it is preferable to address such a difference by changing the intensity of the click feeling developing in the dial knob 10 in accordance with the selection function. Accordingly, the control switch 7 of the sixth embodiment is provided with a detent mechanism 11 capable of generating a click feeling in the dial knob 10. However, the detent mechanism 11 of this type has a characteristic of the intensity of the click feeling developing in the dial knob 10 varying in accordance with the degree of elastic contact of the piece 18 that comes into elastic contact with the concave/convex pattern 13 of the detent crest member 12. For this reason, the characteristic is addressed by changing the degree of elastic contact.

For instance, in a case where settings are made in such a way that a soft click feeling develops in the dial knob 10 when the menu screen 31 is displayed on the display 4, the switch controller 28 withdraws the drive shaft 24a of the rectilinear actuator 24 toward the actuator along with the screen display at the time of display of the menu screen 32 on the display 4; places the drive shaft at the soft click feeling setting position (the state shown in FIG. 21); and places the movable member 22 at a low position. At this time, the urging member 19 becomes extended, to thus enter the soft click feeling setting state. Thus, the urging force achieved when the detent crest member 12 urges the piece 18 from behind is set to a small level. As a result, the piece 18 comes into elastic contact with the concave/convex pattern 13 under weak force, so that a soft click feeling develops in the dial knob 10 and that the dial knob 10 can be rotationally operated under weak force.

For instance, in a case where settings are made in such a way that a hard click feeling develops in the dial knob 10 when the air conditioner function setting screen 34 is displayed on the display 4, the switch controller 28 withdraws the drive shaft 24a of the rectilinear actuator 24 to a position away from the actuator along with the screen display at the time of display of the air conditioner function setting screen 34 on the display 4; places the drive shaft at the hard click feeling setting position (the state shown in FIG. 22); and lifts the movable member 22 high. At this time, the urging member 19 becomes contracted, to thus enter the hard click feeling setting state. Thus, the urging force achieved when the detent crest member 12 urges the piece 18 from behind is set to a high level. As a result, the piece 18 comes into elastic contact with the concave/convex pattern 13 under strong force, so that a hard click feeling develops in the dial knob 10. Thus, rotational operation of the dial knob 10 requires strong force.

Moreover, even when the blower setting screen 38 is displayed as a result of the blower button 35 being selectively operated on the air conditioner function setting screen 34; when the air flow rate setting screen 39 is displayed as a result of the air flow rate setting button 36 being selectively operated; or when an air blast temperature setting screen 40 is displayed as a result of the air blast temperature setting button 37 being selectively operated, the switch controller 27 switches the click feeling developing in the dial knob 10 such that a click feeling whose intensity conforms to each of the display screens develops in the dial knob 10. By way of example, the click feeling is set to a high intensity in order to ensure reliable operation of the dial knob 10 on the blower setting screen 38 having a small number of screen setting items (the number of item buttons). In contrast, the click feeling is set to a low intensity level in order to ensure smooth operation of the dial knob 10 on the air flow rate setting screen 39 or the air blast temperature setting screen 40 having a large number of screen setting items (the number of setting markings).

Accordingly, in the sixth embodiment, the position of the movable member 22 supporting the urging member 19 of the plunger 16 is vertically switched by means of the rectilinear actuator 24, to thus adjust the urging force imparted to the piece 18 by the urging member 19, change the state of elastic contact achieved when the piece 18 comes into elastic contact with the concave/convex pattern 13, and switch the click feeling developing in the dial knob 10. Therefore, the click feeling developing in the dial knob 10 can be freely switched among a plurality of click feeling levels. Even when one dial knob 10 is shared among the plurality of selection functions as in the sixth embodiment, the control switch 7 acts as a control switch conforming to the respective selection functions, so long as a different click feeling is generated from one function to another. This is highly effective for enhancing the sense of operation of a switch.

The detent changeover mechanism 23 of the sixth embodiment is a mechanism that switches the intensity of a click feeling developing in the dial knob 10 as a result of the urging force imparted to the piece 18 by the urging member 19 being switched by use of the movable member 22 and the rectilinear actuator 24. Therefore, when the intensity of the click feeling is switched among a plurality of levels, the intensity of the click feeling developing in the dial knob 10 can be switched without preparation of; for example, detent mechanism components, for each of the click feeling levels. Accordingly, even when a multilevel detent changeover mechanism of this type is incorporated into the control switch apparatus 3, the number of components is not significantly increased correspondingly. This is effective for preventing an increase in the size of the control switch apparatus.

The configuration of the sixth embodiment yields advantages provided below.

(1) The detent changeover mechanism 23 of the present embodiment yields an advantage of elimination of a necessity for preparing detent mechanism components for each click feeling level at the time of switching of the intensity of the click feeling developing in the dial knob 10. Therefore, even when the detent mechanism 23 is incorporated into the control switch apparatus 3, a corresponding significant increase does not arise in the number of components. Even when the intensity of the click feeling developing in the dial knob 10 is made switchable, an increase in the size of the control switch apparatus 3 can be prevented.

(2) Since the rectilinear actuator 24 is used as the drive source for the detent changeover mechanism 23, all of the groups of components used for switching the intensity of the click feeling of the dial knob 10 exhibit linear motion. Consequently, the structure of the detent changeover mechanism 23 can be made simple.

(3) In the sixth embodiment, the operating direction (the direction of the arrow Rc in FIG. 21) of the rectilinear actuator 24 is oriented so as to become orthogonal to the operating direction (the direction of the arrow Rb in FIG. 21) of the movable member 22. Even when external force is exerted on the movable member 22 in a removal direction as a result of forceful rotation of the dial knob 10 when the movable member 22 is in a locked state, the drive shaft 24a of the rectilinear actuator 24 strongly supports the movable member 22. Therefore, even when external force acts on the movable member 22 in a removal direction while the movable member 22 is in the locked state, the rectilinear actuator 24 can press the movable member 22 reliably, thereby making it difficult to cause circumstances where the movable member 22 is unintentionally released from the locked state.

(4) When the position of rotational operation of the dial knob 10 came to the knob rotation stop position, where the rotational operation of the dial knob 10 is restricted, at the time of rotational operation of the dial knob 10, the sense of collision against a wall can be imparted to the dial knob 10 at that knob rotation stop position, so long as the click feeling set to a low intensity level thus far is switched so as to be changed to an extremely-high intensity level. Thereby, the control switch 7 of this type having an unlimited rotational range can also be used as a rotational-operation-range-limited switch having a limited range of rotational operation.

(5) The control switch apparatus 3 of the sixth embodiment uses a GUI that displays various item buttons 5 on the display 4 and that performs button selection determination operation when any of the item buttons is selectively operated by use of the dial knob 10. Even when there is adopted a structure where one dial knob 10 is shared among a plurality of switch selection functions, an operator can be notified, in this case, of the range of operation of the dial knob 10 and selectable selection items acquired by means of the selection function that is in operation at that time. As a result, the operator can ascertain an operation position to which the control switch 7 can be actuated during operation, so that high operability of the control switch 7 can be ensured.

Figure 23:
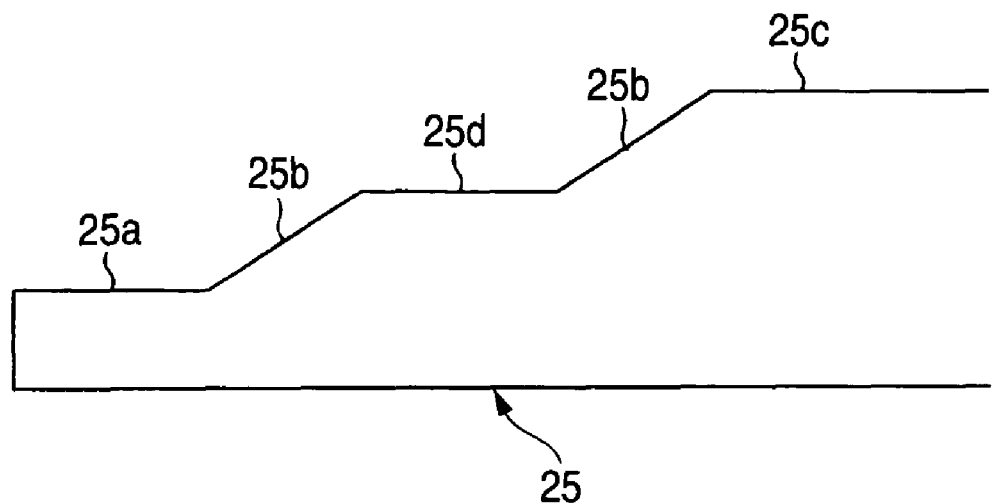
FIG. 23 is a side view showing a support member for use in switching the click feeling in three levels in another embodiment.

The sixth embodiments are not limited to the configurations mentioned above and may also be modified as follows:

In the detent changeover mechanism 23, the number of switchable click feeling levels is not necessarily limited to two, and three or more steps may also be adopted. For instance, as shown in FIG. 23, when the number of crisp levels is three, the supporting member 25 that vertically moves the movable member 22 assumes a shape including the low level portion 25*a* located the lowest position, an intermediate level portion 25*d* located at an intermediate position, and the high level portion 25*c* located at the highest position.

Figure 24:
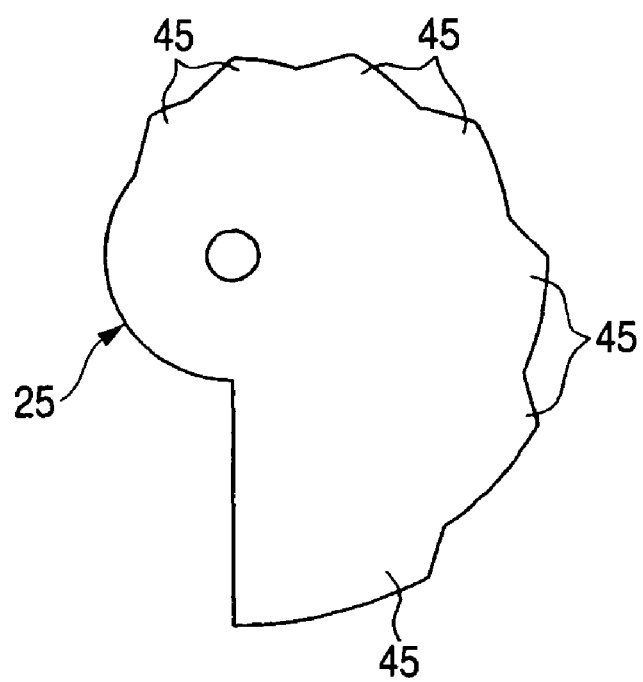
FIG. 24 is a plan view showing the support member achieved when a rotatable actuator is used in still another embodiment.

The actuator serving as the drive source for the detent changeover mechanism 23 is not necessarily limited to the rectilinear actuator 24 whose drive shaft 24*a* performs linear motion, and, for example, a rotatable actuator whose drive shaft 24*a* performs rotational motion may also be used. In this case, the support member 25 performs rotational motion, but the support member 25 at this time assumes a shape having a plurality of steps 45 which differ in height from each other along the rotating direction of the support member 25, as shown in FIG. 24.

Either a solenoid or a motor may be adopted as the actuator serving as the drive-source for switching the locked state of the movable member 22, or another drive source may also be adopted.

The direction of arrangement of the actuator (solenoid) may also be oriented in a direction where the operating direction of the drive shaft becomes orthogonal to the operating direction of the stopper 22 or crosses the same.

The present invention is not limited to the configuration in which the detent crest member 12 is attached to the dial knob 10 and in which the plunger member 16 is attached to the switch case 9. The relationship between the combinations may also be reversed.

The layout and position of the plunger member 16 are not necessarily limited to a position below the detent crest member 12. Specifically, so long as the concave/convex pattern 13 of the detent crest member 12 is formed on an upper surface of a plate material, the plunger member 16 may also be positioned at a place above the detent crest member 12. Alternatively, so long as the concave/convex pattern 13 of the detent crest member 12 is formed on a side surface of the plate material, the plunger member 16 may also be positioned on the lateral side of the detent crest member 12.

Figure 25:
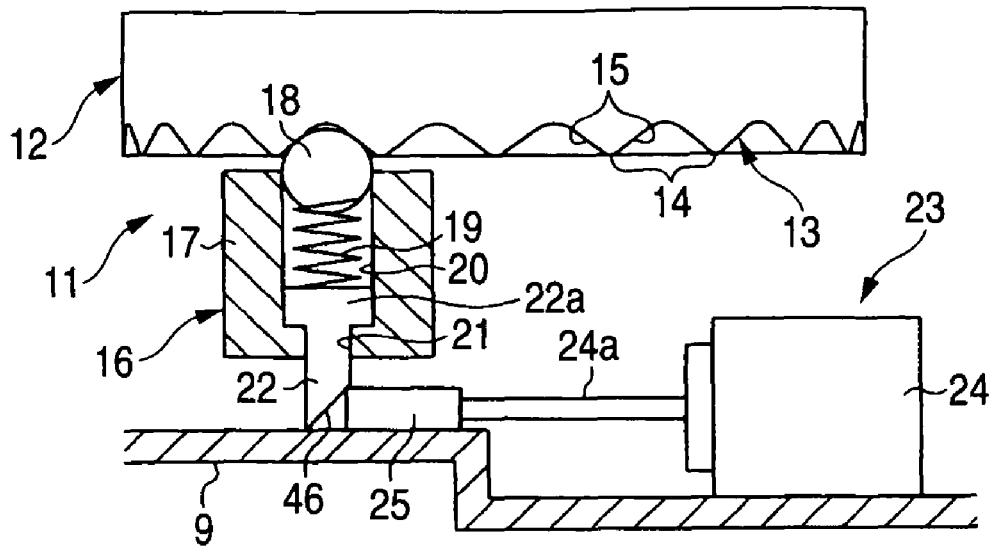
FIG. 25 is a partially-cutaway view showing the general configuration of a detent changeover mechanism of still another embodiment.

A conversion mechanism for converting lateral linear motion of the rectilinear actuator 24 into vertical linear motion of the stopper 22 is not limited to the support member 25 attached to the drive shaft 24*a* of the rectilinear actuator 24. For instance, as shown in FIG. 25, there may also be adopted a structure in which an elevating slope surface 46 is provided at the lower end of the stopper 22 and in which the stopper 22 is lifted along the elevating slope surface 46 when the extremity of the support member 25 is inserted.

Figure 26:
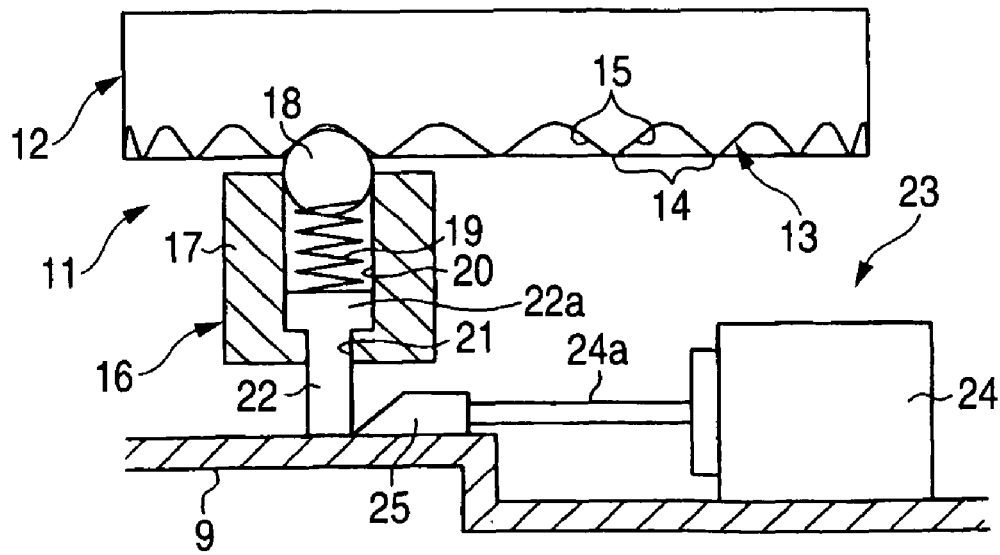
FIG. 26 is a partially-cutaway view showing the general configuration of a detent changeover mechanism of yet another embodiment.

The stopper 22 that stops movement of the piece 18 is not limited to the structure in which, when in the unlocked state, the stopper is always supported by the support member 25. For instance, as shown in FIG. 26, there may also be adopted a structure in which, when in the unlocked state, the movable member 22 is supported by an interior wall surface of the switch case 9.

When the display 4 is; for example, a touch panel, the click feeling of the control switch 7 may also be switched in response to operation of the touch panel. Alternatively, since the amount of rotational operation of the dial knob 10 is determined by the encoder 27, the click feeling of the control switch may also be switched in accordance with the amount of rotational operation.

The piece 18 is not necessarily limited to a spherical shape. For instance, the piece 18 may also assume a shape having a removal prevention portion for preventing removal of the piece from the plunger case 17.

The control switch 7 is not limited to a switch of a rotational operation type in which the dial knob 10 serving as an element to be operated is rotated in the rotational direction. The control switch may also be; for example, a switch of a slide operation type in which an element to be operated is slid in a lateral direction.

The control switch apparatus 3 of the sixth embodiment is not always limited to a switch to be mounted on a vehicle. For instance, so long as the switch has an operation system as with; for example, an electrical appliance, an object on which the switch is to be mounted is not limited particularly.

Technical ideas which can be grasped in view of the embodiments and other examples will be added hereunder in conjunction with their advantages.

(1) According to the present invention, the stopper member enables or restricts positional movement of the piece member, which is held in elastic contact with the crested member by means of the urging member, whereby the operation restriction mechanism indirectly switches operation of the operating portion between an enabled state and a disabled state by way of the piece member. In this case, when the stopper member brings the operating portion into an operation-restricted state, positional movement of the piece member, which is previously held in elastic contact with the recess of the concave/convex pattern, is restricted, thereby restricting operation of the operating portion. Accordingly, it becomes difficult for; for example, an engagement portion located close to the stopper member, to become stranded on a projection portion of the concave/convex pattern when the stopper member restricts the operation of the operating portion, so that the operation of the operating portion can be restricted more reliably.

(2) According to the present invention, the stopper member is configured as a component separate from the piece member. In this case, various mechanism components related to the operation restriction mechanism can be shared regardless of the size of the piece member. Hence, mechanism components of this type do not need to be prepared according to the type of the piece member, and an advantage is yielded in terms of a reduction in component cost, or the like.

(3) According to the present invention, the stopper member is configured as a single component with respect to the piece member. In this case, since the stopper member and the piece member are embodied as a single component, assembly of a mechanism component of the operation restriction mechanism to the control switch is performed by one operation, so that an advantage of enhanced ease of assembly of components is yielded.

(4) According to the present invention, the operation restriction mechanism is operated by means of the rectilinear actuator, wherein the operating direction of the drive shaft, which operates when settings are made as to whether to enable or disable operation of the stopper member, is aligned to the direction of linear motion. In this case, when a rotatable actuator; for example, a motor, is employed as the drive source for the operational actuation mechanism, conversion of rotational motion into linear motion of the stopper member entails imparting of a complicate shape to a component, such as imparting of a step to a rotatable component of the rotatable actuator. However, so long as a rectilinear actuator is used as the drive source for the operation restriction mechanism, the number of groups of components exhibiting linear motion is increased, which is effective for simplification of the structure of the control switch.

(5) According to the present invention, the operation restriction mechanism is operated by a cross rectilinear actuator, wherein the operating direction of a drive shaft, which operates when settings are made as to whether to enable or disable operation of the stopper member, is aligned to the direction of linear motion; and wherein the operating direction of the drive shaft is oriented so as to cross the operating direction of the stopper member. By means of converter that converts linear motion of the cross rectilinear actuator into linear motion oriented so as to cross the stopper member, driving force of the cross rectilinear actuator is transmitted to the stopper member, thereby restricting motion of the operating portion. In this case, a working-effect similar to that yielded by claim 2 is yielded.

(6) According to the present invention, the operation restriction mechanism is operated by a parallel rectilinear actuator, wherein the operating direction of a drive shaft, which operates when settings are made as to whether to enable or disable operation of the stopper member, is aligned to the direction of linear motion; and wherein the operating direction of the drive shaft is oriented in parallel with the operating direction of the stopper member. In this case, a working-effect similar to that yielded by claim 3 is yielded.

(7) According to the present invention, the operation restriction mechanism is operated by a rotatable actuator, wherein the operating direction of a drive shaft, which operates when settings are made as to whether to enable or disable operation of the stopper member, is aligned to a rotational direction. In this case, even when the rotatable actuator is used as a drive source for the operation restriction mechanism, operation of the operating portion can be restricted by restricting motion of the crested member by utilization of recesses of the concave/convex pattern as in the case where the rectilinear actuator is used.

(8) According to the present invention, there are provided detector for detecting an operating state achieved when an operator operates the operating portion; function changeover means for switching selection function of the operating portion in accordance with an amount of detection acquired by the detector; and display controller for displaying on display means a display image corresponding to the selection function when the controller controls whether to enable or disable operation of the operating portion according to the selection function set by the function changeover means. In this case, a display screen corresponding to the selection function selectively designated on each occasion is displayed on the display means. Hence, even when one operating portion is shared among a plurality of selection functions as in the present invention, the range of operation of the operating portion and selection items, which can be selectively operated by means of the selection function selected and designated at that time, can be displayed on the display means. Details that can be operated by way of the operating portion can be reported to the operator for each of the selection functions. Therefore, at the time of operation of the operating portion, the operator can be prevented from being unable to ascertain an operation position where operation is to be performed, which is highly advantageous for ensuring ease of operation of the operating portion.

(9) According to the present invention, the converter is a slope portion interposed between the drive shaft of the cross rectilinear actuator and the urging support means. In this case, it becomes possible to convert linear motion of the cross-arranged rectilinear actuator into linear motion in a direction crossing the urging support member, by means of a simple structure, such as a slope portion.

(10) According to the present invention, there are provided detector for detecting an operating state achieved when an operator operates the operating portion; function changeover means for switching selection functions of the operating portion in accordance with an amount of detection performed by the detector; and display controller for displaying on display means a display screen corresponding to the selection function when the controller switches the click feeling of the operating portion in accordance with the selection function set by the function changeover means. In this case, a display screen corresponding to the selection function selectively designated on each occasion is displayed on the display means. Hence, even when one operating portion is shared among a plurality of selection functions as in the present invention, the range of operation of the operating portion and selection items, which can be selectively operated by means of the selection function selected and designated at that time, can be displayed on the display means. Details that can be operated by way of the operating portion can be reported to the operator for each of the selection functions. Therefore, at the time of operation of the operating portion, the operator can be prevented from being unable to ascertain an operation position where operation is to be performed, which is highly advantageous for ensuring ease of operation of the operating portion.

(11) According to the present invention, the detent changeover mechanism is operated by a rotatable actuator, wherein the operating direction of a drive shaft, which operates when settings are made as to whether to enable or disable operation of the stopper member, is aligned to the direction of rotational operation. In this case, even when a rotatable actuator is used for a drive source of the detent changeover mechanism, a limitation can be lifted on operation of the operating portion by restricting motion of the crested member by utilization of the recess of the concave/convex pattern as with the rectilinear actuator.

What is claimed is:

1. A control switch apparatus for performing selection function operation, comprising:
   a control switch that includes an operating portion to be operated by an operator and a fixed portion;
   a detent crest member that has a concave/convex pattern which is aligned in an operating direction of the operating portion and is provided on one of the operating portion and the fixed portion;
   a plunger member that is provided on the other of the operating portion and the fixed portion and includes an urging member and a piece member to be brought into elastic contact with the concave/convex pattern by the urging member so that a click feeling is generated at the operating portion when the piece member gets over a projection portion of the concave/convex pattern at the time of operating the operating portion; and
   an operation restriction mechanism that includes a stopper member for directly or indirectly acting on the detent crest member and restricting motion of the operating portion to switch the operation of the operating portion between an enable state and a disable state,
   wherein the stopper member is movably assembled into the plunger member; and
   wherein the operation restriction mechanism includes:
      a driving portion that drives the stopper member so as to press the piece member to the concave/convex pattern so that the motion of the operating portion is restricted by the piece member;

a detector that detects an operating state in which the operator operates the operating portion; and a controller that controls and drives the driving portion in accordance with an amount of detection acquired by the detector and causes the stopper member to restriction the motion of the piece member, thereby controlling the enable state and the disable state of the operation of the operating portion.

2. The control switch according to claim 1, wherein the driving portion includes a parallel rectilinear actuator that acts as a drive source for operating the stopper member and includes a drive shaft capable of performing reciprocal linear movement, an operating direction of the drive shaft being oriented parallel to an operating direction of the stopper member; and wherein the controller controls and drives the parallel rectilinear actuator in accordance with the amount of detection acquired by the detector and that causes the stopper member to restrict the motion of the piece member, thereby controlling the enable state and the disable state of the operation of the operating portion.

3. The control switch according to claim 1, wherein the driving portion includes:

a cross rectilinear actuator that acts as a drive source for operating the stopper member and includes a drive shaft capable of performing reciprocal linear movement, an operating direction of the drive shaft being oriented so as to cross an operating direction of the stopper member; and a converter that transmits linear motion of the cross rectilinear actuator to the stopper member to drive the stopper member in the operating direction of the stopper member; and wherein the controller controls and drives the cross rectilinear actuator in accordance with the amount of detection acquired by the detector and causes the stopper member to restrict the motion of the piece member, thereby controlling the enable state and the disable state of the operation of the operating portion.

4. The control switch according to claim 1, wherein the driving portion includes:

a solenoid that acts as a drive source for operating the stopper member, and includes a movable metal attached to the stopper member and an excitation coil for restricting motion of the movable metal by turning on or off energization of the excitation coil; and a solenoid-side urging member that is interposed between the movable metal of the solenoid and a case interior surface of the plunger member and brings the piece member into elastic contact with the concave/convex pattern; and wherein the controller controls and drives the solenoid in accordance with amount of detection acquired by the detector and causes the stopper member to restrict the motion of the piece member, thereby controlling the enable state and the disable state of the operation of the operating portion.

5. The control switch according to claim 1, wherein the stopper member is directly engageable with a recess of the detent crest member;

wherein the driving portion includes a parallel rectilinear actuator that acts as a drive source for operating the stopper member and includes a drive shaft for performing reciprocal linear movement, an operating direction of the drive shaft being oriented parallel to an operating direction of the stopper member; and wherein the controller controls and drives the parallel rectilinear actuator in accordance with the amount of detection acquired by the detector, thereby controlling the enable state and the disable state of the operation of the operating portion by bringing the stopper member into engagement with or disengagement from the recess of the concave/convex pattern.

6. The control switch according to claim 1, wherein the stopper member is formed separately from the piece member.

7. The control switch according to claim 1, wherein the stopper member is formed integrally with the piece member.

* * * * *